Feb. 16, 1965 E. T. HOWES 3,170,136
SYSTEM FOR LOGGING WELLS
Filed Oct. 13, 1954 8 Sheets-Sheet 1

EDGAR T. HOWES,
INVENTOR.
BY Reed C. Lawlor
ATTORNEY.
AND Frank B. Coker
AGENT.

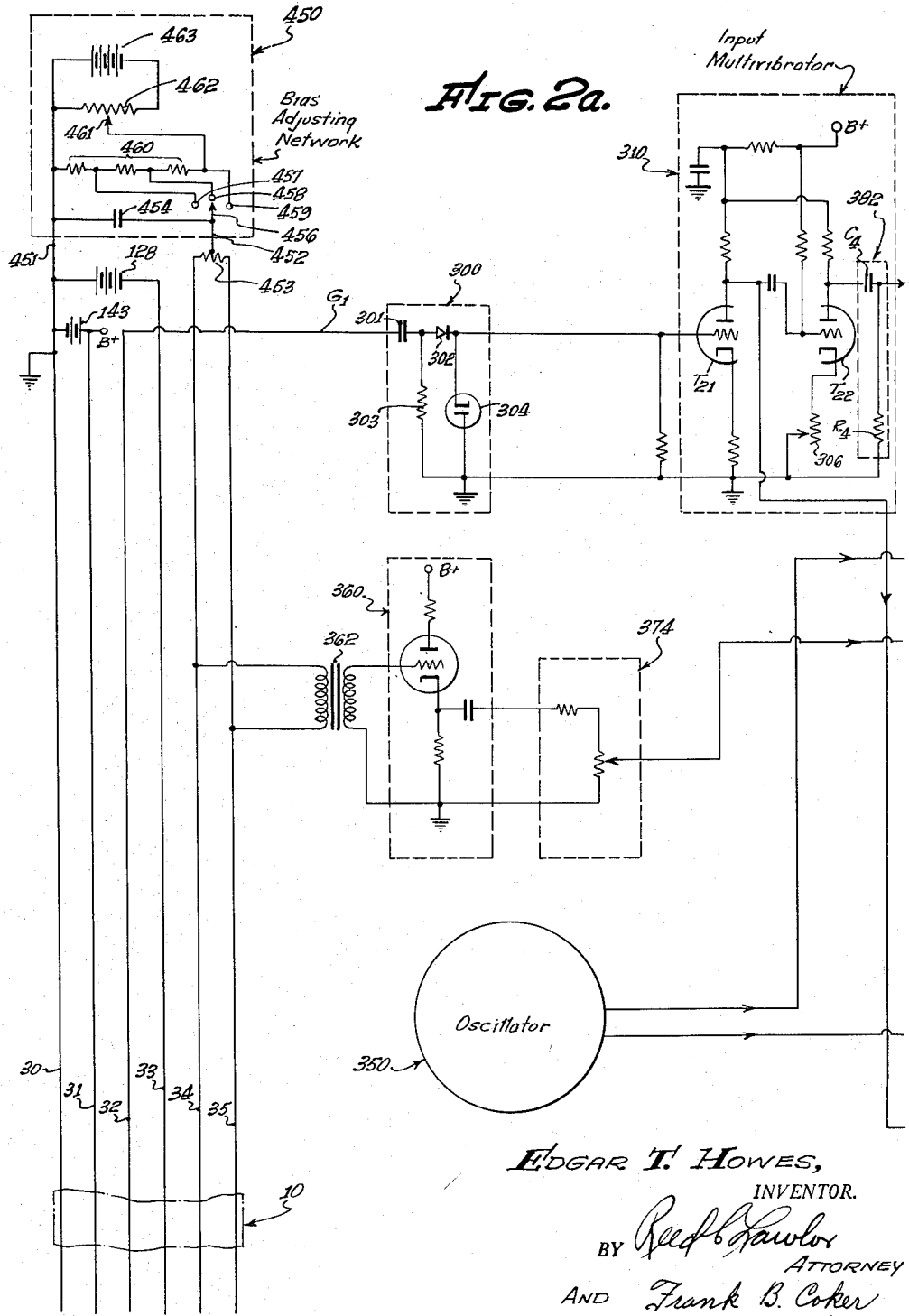

Feb. 16, 1965  E. T. HOWES  3,170,136
SYSTEM FOR LOGGING WELLS
Filed Oct. 13, 1954  8 Sheets-Sheet 4
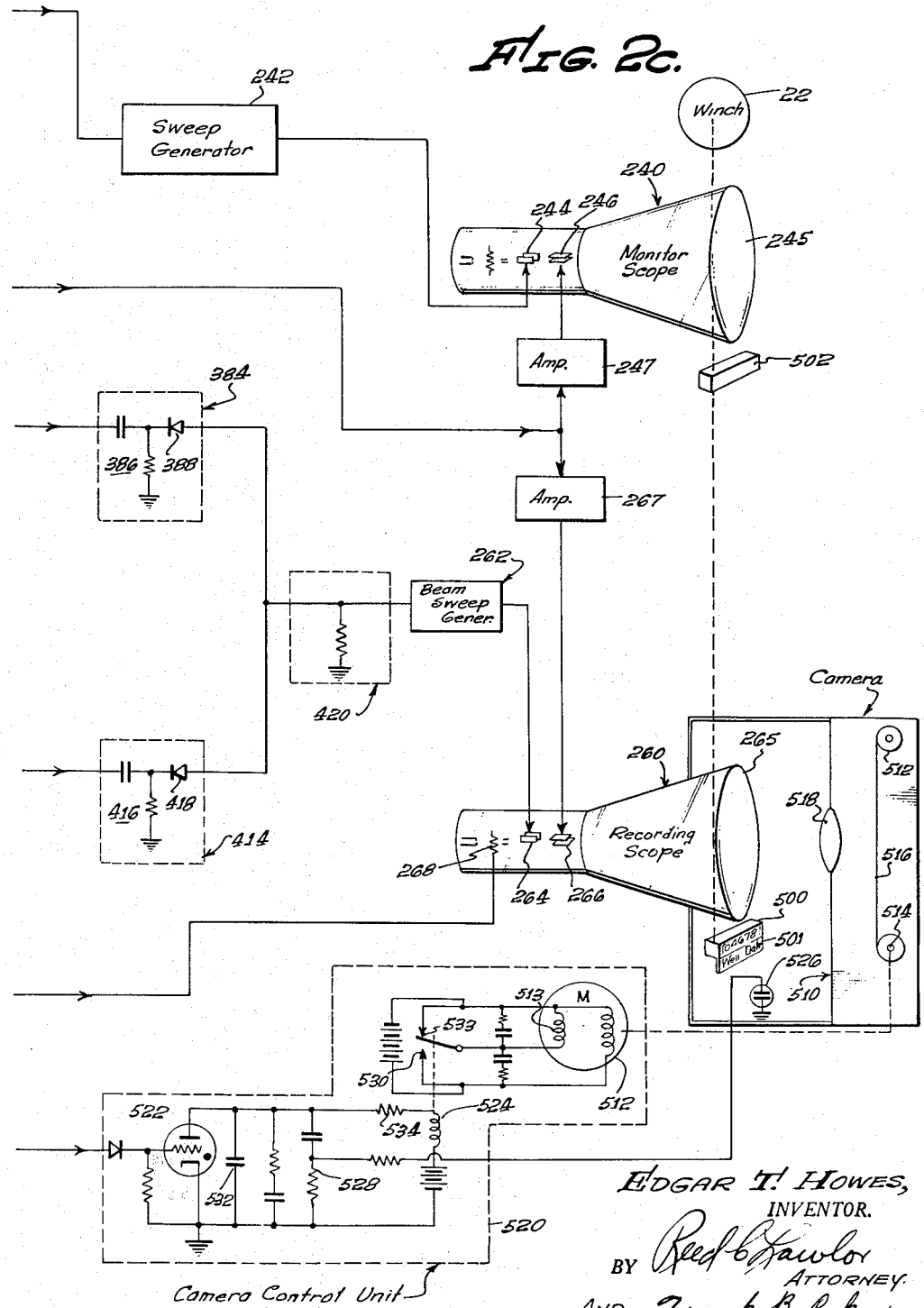

Feb. 16, 1965
E. T. HOWES
3,170,136
SYSTEM FOR LOGGING WELLS
Filed Oct. 13, 1954
8 Sheets-Sheet 5
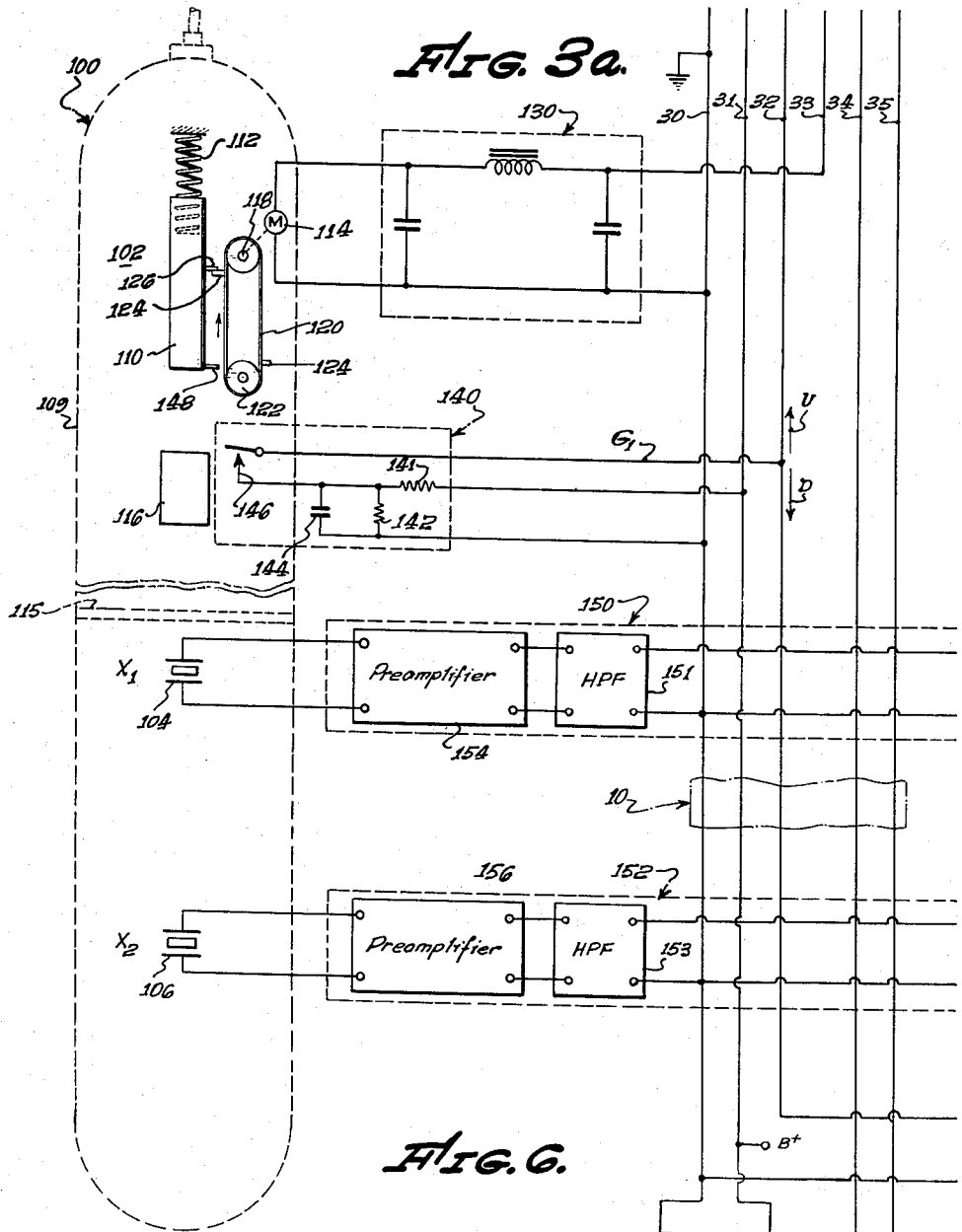
EDGAR T. HOWES,
INVENTOR.
BY Reed C. Lawlor
ATTORNEY.
AND Frank B. Coker
AGENT.

Figure 3B:
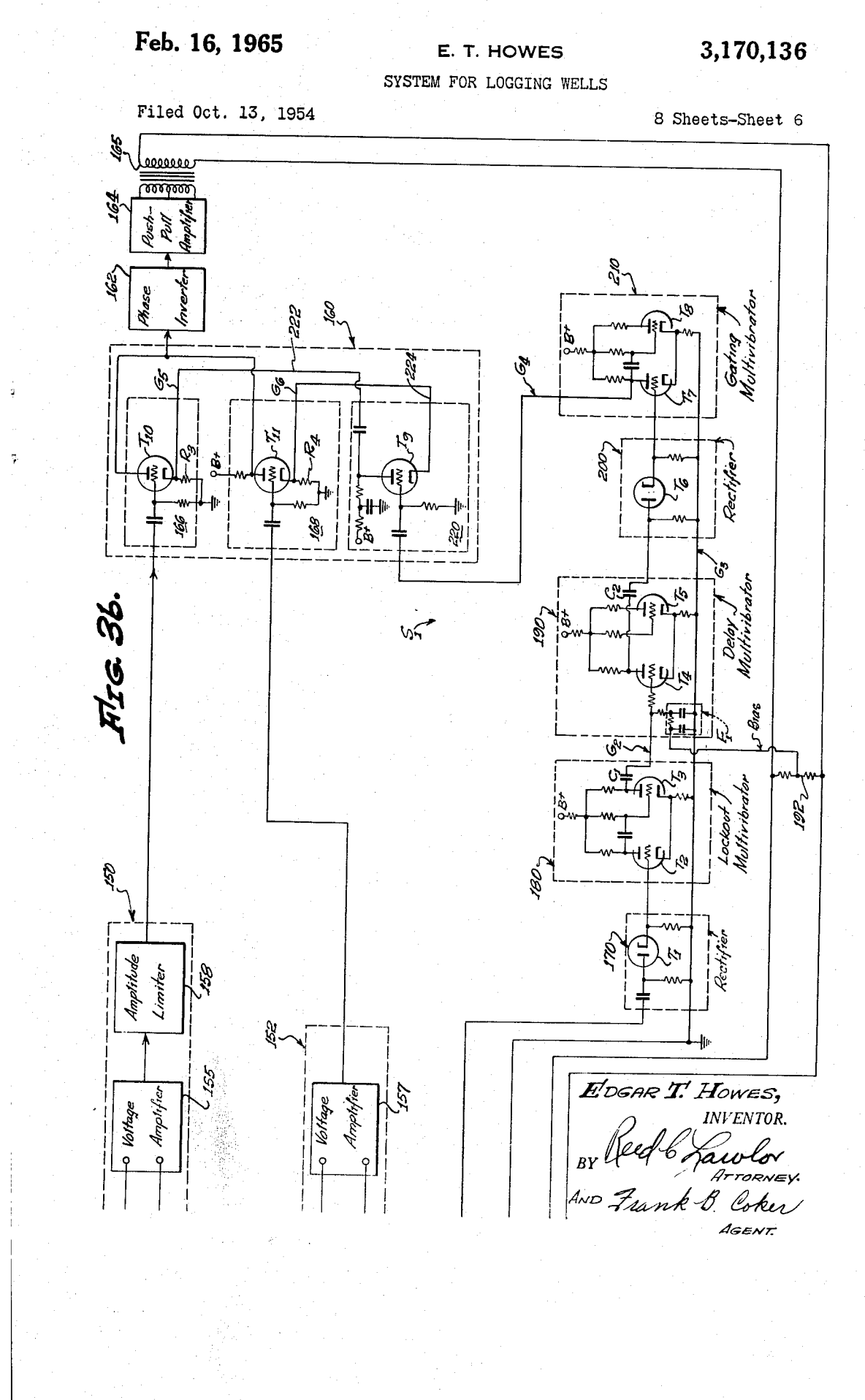

Feb. 16, 1965

E. T. HOWES 3,170,136

SYSTEM FOR LOGGING WELLS

Filed Oct. 13, 1954

EDGAR T. HOWES,
INVENTOR.

BY Reed C. Lawlor
ATTORNEY.

AND Frank B. Coker
AGENT.

Feb. 16, 1965  E. T. HOWES  3,170,136
SYSTEM FOR LOGGING WELLS
Filed Oct. 13, 1954  8 Sheets-Sheet 7

EDGAR T. HOWES,
INVENTOR.

BY Reed C. Lawlor
ATTORNEY.

AND Frank B. Coker
AGENT.

United States Patent Office 3,170,136
Patented Feb. 16, 1965

3,170,136
SYSTEM FOR LOGGING WELLS
Edgar T. Howes, Pasadena, Calif., assignor to United
Geophysical Corporation, a corporation of California
Filed Oct. 13, 1954, Ser. No. 462,062
30 Claims. (Cl. 340—18)

This invention relates to improvements in systems for logging wells, and more particularly to improvements in systems for logging the seismic wave characteristics, especially the seismic wave interval velocity, of formations intersected by a well.

Numerous systems have been developed for logging wells which extend through various formations of the earth. Some of these systems involve the generation of seismic waves at a source in a well and the transmission of these waves through the surrounding formations to seismic wave receivers, or detectors, which are also located in the wells at spaced points relative to the source.

This invention deals particularly with systems for measuring the time interval elapsed between the arrival of waves that have been generated at the source and which are received by the respective receivers after the waves have travelled along a least-time path through the material of the formation opposite the receivers. The first parts of the arriving waves are called "first breaks." The time interval between the arrival of the first breaks at the respective receivers is proportional to the distance between the receivers and is also inversely proportional to the velocity of transmission of the waves in the formations opposite the receivers. This velocity is hereinafter referred to as the "interval velocity," since it is the velocity over a short spacial interval of the formations.

Though various phases and features of the present invention are applicable to other systems, the invention is described particularly with reference to a system in which seismic waves are generated periodically at such a source while the source and the receivers are being moved in unison in the well. In the system described herein, hydrophones are employed as receivers. The hydrophones are of a form which employ piezoelectric crystal elements as detectors. The electrical signals developed by these detectors in response to seismic waves arriving at the receivers are applied to separate amplifiers and the amplified signals are transmitted to the surface.

In the particular embodiment of the invention described herein, the source is operated periodically by means of power supplied by a battery at the surface. The amplifiers are also supplied with power from the surface. The source and the receivers are supported in the well by means of a conventional logging cable of the type which is commercially available for supporting electrical instruments in a bore hole. Certain parts of the apparatus at the surface are operated by means of a trigger pulse that is produced in the well unit each time that seismic waves are generated and received in the well unit. Signal conductors are employed to transmit signals from the outputs of the amplifiers to the surface and separate conductors are employed to carry different potentials from batteries at the surface to various parts of the well unit.

Logging cables of the type commonly used in well surveying, such as electric logging, generally employ, at the most, six mutually insulated conductors supported within a grounded metallic sheath. In the logging cables generally available commercially, one of the insulated conductors is employed for a special purpose which makes it unavailable for use with the present invention. Thus, in effect, only five conductors included in the grounded sheath and the grounded sheath itself are available.

One of the objects of this invention is to provide an improved arrangement for carrying potentials from batteries at the surface to various parts of a well unit through a cable having a small number of conductors.

Another object of the invention is to provide an arrangement for employing common signal conductors for transmitting to the surface signals received by different detectors without the signals received by one detector interfering with the transmission of signals received by another detector.

Another object of the invention is to provide a novel arrangement for transmitting control voltages over the signal conductors to the subsurface equipment.

Another object of the invention is to provide an arrangement for switching the signal conductors from one detector to the other between the times that seismic waves first arrive at the respective detectors.

Another object of the invention is to provide an arrangement for adjusting this switching time by means of a voltage that is adjusted at the surface and that is transmitted to a switching device in the well unit.

Another object of the invention is to provide an arrangement for displaying at the surface the reproductions of the signals received by the respective detectors so as to facilitate the adjustment of the switching time.

Another object of the invention is to provide an improved system for detecting seismic waves in a bore hole.

Still another object is to provide an arrangement for faithfully reproducing at the surface seismic waves received at a plurality of detectors without disturbance from extraneous signals even though a switching circuit is employed to apply signals from different detectors to common signal conductors.

A further object of the invention is to provide an arrangement for recording at the surface reproductions of the signals received by the respective detectors together with means for monitoring the recorded signals.

A further object of the invention is to provide a novel arrangement for displaying oscillogram traces on the face of an oscilloscope and also for displaying timing lines thereon for use in measuring the times at which various events represented by the traces occur.

A further object of the invention is to provide an arrangement for automatically photographing such traces and timing lines.

A further object of the invention is to provide an arrangement for the recording of the depths of the well unit on the same records on which such traces and timing lines are recorded.

Still a further object of the invention is to provide in a well logging system an arrangement for periodically making records of measurements at various depths and for recording such depths.

The foregoing and other objects of the invention, together with various features, applications, and advantages thereof, will appear more fully from the detailed description of the embodiment of the invention which is illustrated in the accompanying drawing, wherein:

FIGS. 2a, 2b and 2c are schematic diargams of various sections of the surface equipment employed in the invention;

FIGS. 3a and 3b are schematic diagrams of subsurface equipment employed in the invention;

FIG. 6 is a diagram showing how FIGS. 2a, 2b, 2c, 3a and 3b are assembled to form a complete schematic wiring diagram of the system;

Figure 1:
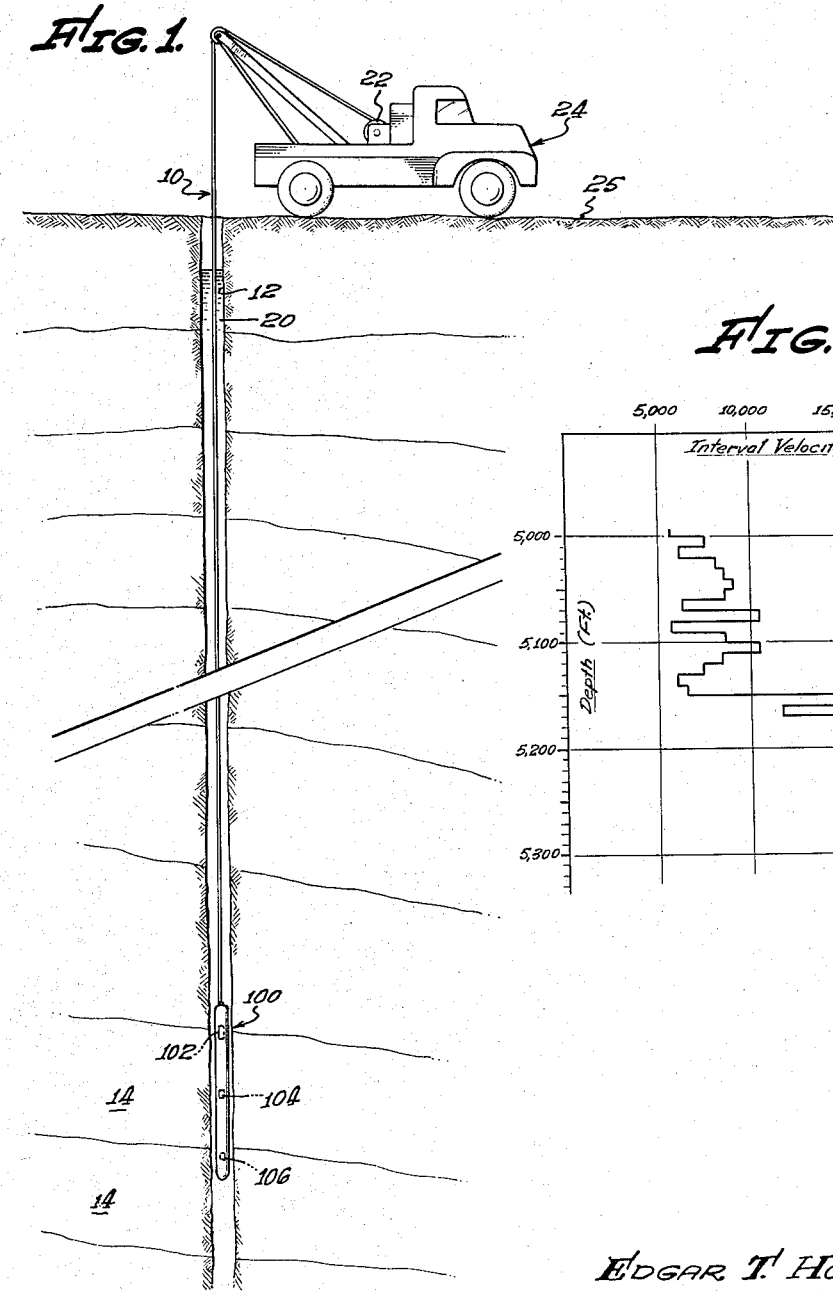
FIGURE 1 is a schematic diagram of a system employing the invention.

According to this invention, when considered in its broader aspect as illustrated in FIG. 1, a well unit 100 supported by a cable 10 is raised and lowered in a well 20 by means of a winch 22 carried by a truck 24 at the surface 25 of the earth. The well unit 100 includes a seismic-wave generator or transmitter 102 and a pair of seismic-wave receivers 104 and 106, all arranged within a common housing or casing 107, which is attached to the lowermost end of the cable 10.

The seismic-wave transmitter 102 includes an element for radiating a seismic-wave pulse into the fluid in which the well unit is immersed and into the surrounding formations 14 through which the well extends. The two seismic-wave receivers 104 and 106 may be in the form of hydrophones which respond to waves that travel thereto either directly by a path through the fluid within the well from the seismic-wave transmitter 102, or after being transmitted through the formations forming the walls of the well 20. The transmitter 102 and the two hydrophones 104 and 106 are arranged on a vertical line in the order mentioned, with the transmitter above the hydrophones, the first, or upper hydrophone 104 being equally spaced from the transmitter 102 and from the second, or lower hydrophone 106. The well unit 100 also includes the subsurface electrical equipment, as more fully described hereinafter, which is employed for operating the transmitter 102 and for transmitting to the surface unit, a signal that indicates the instant of operation of the transmitter and other signals that correspond to the seismic waves that are received by the hydrophones 104 and 106 and that indicate the instants of arrival of waves at the hydrophones. A well unit of the type which may be employed in this invention is described in more detail in co-pending patent application Serial No. 506,819, filed May 9, 1955, now Patent 2,993,553.

As the cable 10 is raised or lowered in the well, the well unit 100 passes through various formations which are characterized by different seismic wave velocities. As more fully explained hereinafter, the seismic wave transmitter 102 is operated periodically at regular intervals, and records are made at the surface at the time at which the waves are generated and records are also made of the waves received at the two hydrophones 104 and 106 after travel through the surrounding formations. Generally speaking, waves which are emitted by the transmitter 102, enter the surrounding formations and part of the energy of these waves travels downwardly along the walls of the bore hole 20. Some of the energy is returned into the well, thereby arriving at the hydrophones 104 and 106 at spaced time intervals that depend upon the seismic wave velocity of the material in the surrounding formation. It is thought that the waves enter the surrounding formations and re-enter the bore hole by a "refraction" process. However, the operation of my invention does not depend upon whether this explanation is correct or not.

The time interval that exists between the successive times of arrival of a particular wave at the two respective hydrophones 104 and 106, depends upon the velocity of the material that is in the part of the well directly opposite the space between the two hydrophones. As a matter of fact, the time interval is inversely proportional to that velocity. The seismic wave velocity at each depth is determined by measuring the time elapsed between first breaks of the wave received at the two hydrophones and dividing this elapsed time into the distance between the two hydrophones. So long as the well unit 100 is resting on the side of the well 20, or is spaced uniformly therefrom, the time interval between the times of arrival of the waves and the two hydrophones 104 and 106 is substantially independent of any variations in the diameter of the well 20.

In practice, if the well 20 is not of uniform cross-section, or if the well unit 100 is not spaced in some uniform manner from the wall of the bore hole, errors may arise. The methods of eliminating such errors or of making corrections for them, in case they exist, are not considered here.

In the particular embodiment of the invention described herein, records are made of the first breaks or "first arrivals," and also some of the early waves, that are received by the respective hydrophones 104 and 106 each time that the seismic wave transmitter 102 generates a train of seismic waves. According to this invention, a switching unit, that is mounted within the well unit 100, is employed to transmit signals produced at the two hydrophones 104 and 106 over a common pair of signal conductors in the cable 10. The switching unit is so arranged as to selectively connect the two hydrophones 104 and 106, respectively, to the conductors during the times that the first arrivals are being received by the hydrophones. Furthermore, in accordance with this invention, the times at which the switching occurs are controlled from the surface so that records of first breaks and early waves may be made at different levels even though the velocity of the formations through which the waves travel differ considerably from one level to another. In the specific embodiment of the invention disclosed herein, a main control or synchronizing signal in the form of a trigger pulse created just prior to the time the seismic waves are generated by the source 102 and also signals indicating when the first breaks are received by the hydrophones 104 and 106, as well as electrical reproductions of early arriving waves, are transmitted through the cable to a recorder in the truck 24. The synchronizing signal is employed at the surface to generate a time break signal that occurs simultaneously with the striking of the hammer. Records are made of the time break signal and the signals transmitted to the surface from the receivers as a function of time. These records then indicate the time intervals required for the waves to travel from the seismic wave generator 102 to the respective hydrophones 104 and 106, and the time interval elapsed between the arrival of the same wave at the respective hydrophones. The waves that are received by the two hydrophones are not only recorded at the surface, but they are also displayed there in visual form so that an operator can, by remote control, adjust the switching mechanism that is located in the well unit 100 to assure that it operates in such a way that the first arrivals and other early waves detected at both the hydrophones 104 and 106 are separately transmitted to the recorder.

In the specific embodiment of the invention that has been constructed the cable 10 includes six mutually insulated conductors, 30, 31, 32, 33, 34 and 35, which are employed to supply power to the various electrical units in the well unit 100 and to carry signals to the surface. The first mentioned conductor 30, which is grounded, is formed by the outer metallic sheath of the cable, while the remaining conductors 31, 32, 33, 34 and 35 are in the form of insulated conductors that are contained within that sheath. The transmitter 102, the receivers 104 and 106, and the associated electrical units are all mounted within a common casing 109, though for simplicity in FIGS. 3a and 3b the electrical units and the conductors 30–35 are drawn at points that are apparently outside the casing 109.

As indicated in FIG. 3a, and as more fully explained in co-pending patent application Serial No. 506,819, filed May 9, 1955, now Patent 2,993,553, the seismic wave source, or transmitter, 102 comprises a hammer 110 which is normally urged toward the downward or lowermost position by means of a strong compression spring 112. An electric D.C. motor 114, driven by power supplied from the surface, is employed to slowly raise the hammer 110 periodically to its uppermost position from which it is periodically released to strike an anvil 116 that is disposed directly beneath the hammer 110, and is rigidly secured to the case. The mechanism for raising and releasing the hammer 110 is in the form of a driving sprocket 118 operated directly by the motor 114 and a chain 120 that passes over the driving sprocket 118 and over a driven sprocket 122. The chain 120 carries a pair of outwardly projecting members in the form of fingers 124 which are located at equally spaced positions thereon. As each of the fingers 124 passes upwardly adjacent the hammer 110, it engages a corresponding projecting member 126 on the hammer, thereby forcing the hammer upwardly against the force of the spring 112 and storing potential energy in the spring 112 and in the hammer 110. When each of the fingers 124 reaches its uppermost position and withdraws from the hammer 110, it becomes disengaged from the hammer projection 126, thereby releasing the hammer 110 and permitting the spring to force the hammer 110 downward rapidly to strike the anvil 116. The motor 114 is driven continuously, thereby causing the hammer to strike the anvil 116 periodically at regular short intervals of time, such as once every five seconds. The power is supplied by a battery or D.C. generator 128 at the surface through the grounded conductor 30 and one of the other conductors 33 to the motor 114. The motor is connected directly to the conductors 30 and 33 through a lowpass filter 130 which is designed to prevent any commutator noise generated by the motor 114 from being transmitted to the cable and hence by inductive or capacitive reaction between the conductors to the recorder at the surface.

Figure 8:
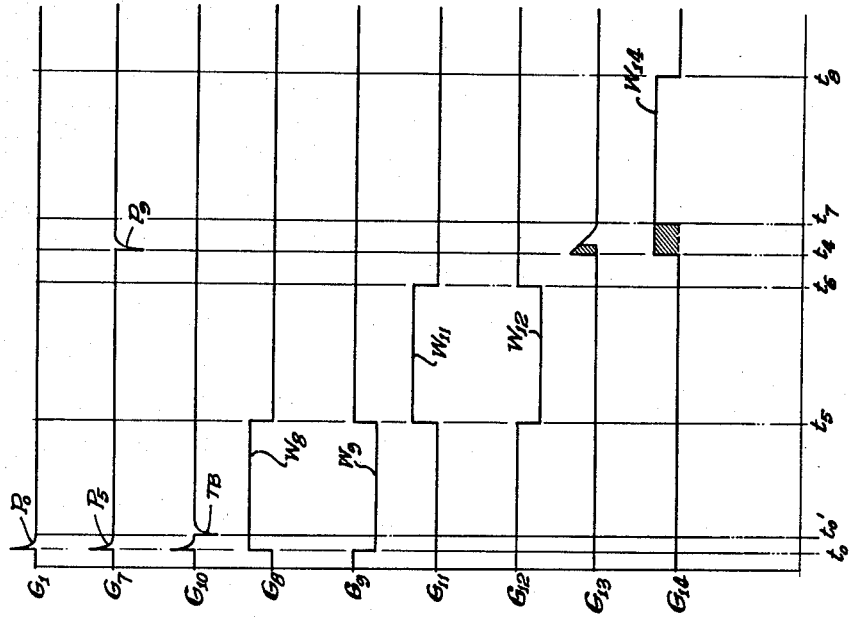
FIGS. 7 and 8 are time-coordinated graphs employed to explain the relationship between various events occurring in the subsurface equipment and in the surface equipment, respectively.
Figure 7:
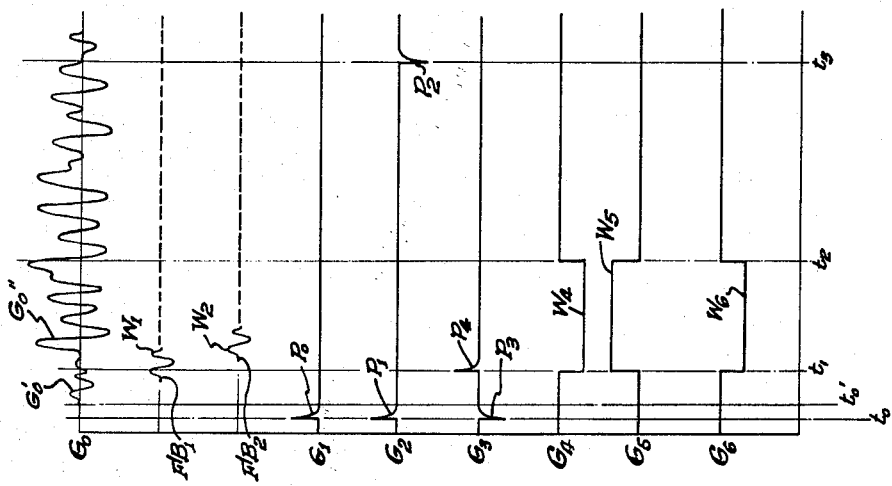

A trigger-pulse generator 140 is actuated by the hammer 110 at a time just prior to the instant that the hammer strikes the anvil 116, thereby generating a main control signal, or trigger pulse $P_0$ as indicated by graph $G_1$ of FIGS. 7 and 8. This pulse is employed not only to indicate the instant $t_0'$ that the hammer 110 strikes the anvil 116 but also to synchronize the operation of a first switching circuit $S_1$ (see FIG. 3b) that is located in the well unit and a second switching circuit $S_2$ (see FIG. 2b) that is employed in the recorder. The pulse so generated is transmitted by the conductor 32 downwardly to the first switching unit $S_1$ and also upwardly to the second switching circuit $S_2$ in the surface unit as indicated in FIG. 3a by the arrows D and U, respectively.

More particularly, the trigger generator 140 comprises a potential divider consisting of two resistances 141 and 142 that are connected across conductors 30 and 31 to which D.C. voltage is applied by a battery 143 at the surface. A condenser 144 is connected across resistor 142. A normally open switch 146 is arranged to connect the junction between resistors 141 and 142 to the pulse transmission conductor 32.

The switch 146 is located opposite a finger 148 that is carried by the hammer 110 and which is arranged to close the switch 146 and discharge capacitor 144 into conductors 30 and 32 at time $t_0$ just before the instant $t_0'$ that the hammer 110 strikes the anvil 116. The synchronizing trigger pulse $P_0$ that is produced each time the switch 146 closes, is employed in the manner described in detail hereinafter to connect the two seismic wave receivers 104 and 106 one at a time to the signal leads 34 and 35. The trigger pulse is also employed as described in detail hereinafter to control the recording system in such a way as to record timing lines and the timing signal in sequence on the same sheet of recording paper or film. In this manner the trigger pulse synchronizes the operation of the well unit and the recording system.

The B+ power that is required by the various electronic circuits located in the well unit is obtained from surface battery 143 through conductor 31. The power required to supply the filaments F of the amplifying tubes of those electronic circuits is also obtained from surface battery 143 through conductor 31.

When seismic waves arrive at the respective receivers 104 and 106 they are converted into electrical waves that vary in a corresponding manner, and which are therefore electrical reproductions or replicas of the seismic waves. In the particular embodiment of the invention described herein the "first breaks" are of principal concern, although other parts of early arriving waves are also of interest in some applications of the invention. Thus, when a seismic wave train travelling from the transmitter 102 arrives at each of the receivers 104 and 106, a sharp voltage increase occurs in the output of each receiver which indicates the instant of arrival of the wave at that receiver.

As indicated in FIG. 3a, two preamplifiers 154 and 156 are connected respectively to the output of the corresponding receivers 104 and 106. The outputs of the two preamplifiers 154 and 156 are amplified by corresponding voltage amplifiers 155 and 157 as indicated in FIG. 3b. The output of the first voltage amplifier is passed through an amplitude limiter 158. The preamplifier 154, voltage amplifier 155 and amplitude limiter 158 form a first amplifier channel 150 through which waves from the upper receiver 104 are passed and the preamplifier 156 and voltage amplifier 157 form a second amplifier channel 152 through which waves from the lower receiver 106 are passed. The outputs of these two amplifier channels 150 and 152 are transmitted through a gating circuit 160, a phase inverter 162 and a push-pull amplifier 164 in the order named, and then through a transformer 165 to the common pair of signal conductors 34 and 35. The gating circuit 160 is controlled by the trigger pulse $P_0$ generated by the trigger circuit 140 so that the outputs of the respective amplifier channels 150 and 152 are applied to the signal conductors 34 and 35 during time intervals that overlap the instants when the first breaks occur at the respective receivers 104 and 106.

The first switching circuit $S_1$ that transmits the outputs of the two amplifier channels 150 and 152 to the signal conductors 34 and 35 includes not only the gating circuit 160 but also a rectifier 170, a lockout multivibrator 180, a delay multivibrator 190, a rectifier 200, a gating multivibrator 210, and a gate control circuit 220.

The gating circuit 160 comprises two separate gate channels 166 and 168 through which the outputs of the separate amplifier channels 150 and 152 are applied to the phase inverter 162. The gate control circuit 220 is provided with two output terminals which are respectively connected through suitable conductors to the corresponding gate channels 166 and 168.

Normally, that is when the apparatus is in a quiescent state, ready to be operated by trigger pulses generated by the trigger pulse generator 140, the upper gate channel 166 is open and lower gate channel 168 is closed. The well unit 100 is thus in such a condition that waves, if any are present, being received by the upper receiver 104 would be transmitted through its amplifier channel 150, its gate channel 166, the phase inverter 162, and the push-pull amplifier 164 to the signal conductors 34 and 35 and thence to the recording system at the surface.

Just prior to each operation of the transmitter 102 the trigger pulse generator 140 produces a corresponding trigger pulse $P_0$ which actuates the lockout multivibrator 180, which in turn initiates the operation of the delay multivibrator 190. The upper gate channel 166 remains open until the delay multivibrator 190 restores to the quiescent state, i.e., for an interval of time that overlaps the period when the first break is being received by the upper receiver 104. Shortly thereafter the switching circuit $S_1$ causes the upper gate channel 166 to close and the lower gate channel 168 to open. The switching delay interval is so chosen that the outputs from the receivers 104 and 106 are respectively connected to the signal conductors 34 and 35 during intervals which overlap the times of reception of the first breaks at the respective receivers 104 and 106. By this switching mechanism the conductors 34 and 35 serve the purpose of transmitting in sequence the waves corresponding to the reception of the first break and other early arriving waves at receiver 104, and the waves corresponding with the reception of the first break and other early arriving waves at receiver 106. In addition, as explained hereinafter, the signal conductors 34 and 35 are also employed to apply a variable bias to the delay multivibrator 190 of the switching circuits $S_1$ to adjust the switching delay interval by remote control from the surface.

As shown in FIG. 3b the rectifier 170 is of a simple type, including a diode $T_1$, which transmits only positive pulses from its input to its output. Furthermore, the rectifier 170 has a zero time constant, there being no condenser in its output on which charges may accumulate. Thus, positive trigger pulses generated by the trigger generator 140 are transmitted instantaneously to the lockout multivibrator 180. The rectifier 170 prevents any negative components that may exist in the trigger pulse from inadvertently restoring the lockout multivibrator 180 after it has operated.

The lockout multivibrator 180 is of the single-shot monostable type having a period of operation which is less than the interval between successive trigger pulses. However, its period of operation is long compared with the operating periods of the switching circuits $S_1$ and is also greater than the period required to make a complete record of the time break TB and of the first breaks of the waves received by the two hydrophones 104 and 106, and may also extend beyond the period during which timing lines are placed on the record, as more fully explained hereinafter. When the lockout multivibrator 180 is in its quiescent or normal condition, the input triode $T_2$ is non-conducting while the output triode $T_3$ is conducting. When a positive pulse is applied to the input triode $T_2$, this triode conducts, thereby cutting off the output triode $T_3$, increasing the voltage at its anode sharply in a positive direction. Inasmuch as the input impedance of the delay multivibrator 190 is resistive and the value of capacitor $C_1$ is small, the voltage applied to the multivibrator 190 through the coupling condenser $C_1$ is effectively differentiated. In effect the rectifier 170 and the lockout multivibrator 180 act to "lock-out" any spurious pulses that may appear in the circuit after the occurrence of the trigger pulse $P_0$. Thus, any undesired pulses arising, for example, from erratic operation of the contacts 146 of the trigger pulse generator 140 are prevented from causing any erratic or undesired triggering or restoring of the switching circuits $S_1$. The rise time of the lockout multivibrator 180 is very short, being for example of the order of a microsecond. As a result, the delay multivibrator 190 is actuated in an accurately timed relationship with the generation of the trigger pulse $P_0$ by the trigger pulse generator 140. Moreover, since the hammer 110 executes a periodic motion in which its distance of vertical travel is the same from operation to operation, and furthermore, since the spring 112 has relatively constant characteristics, the short time interval between the actuation of switch contacts 146 by the finger 124 and the actual contact between the hammer 110 and the anvil 116 is very nearly a constant value. As a result the delay multivibrator 190 is also actuated in an accurately timed relationship with the instant of generation of the seismic waves by the transmitter 102. As indicated by graph $G_2$, a positive pulse $P_1$ is generated at the output of the lockout multivibrator 180 at the time $t_0$ that the trigger pulse $P_0$ is generated. Also, a negative pulse $P_2$ is produced at the output of the lockout multivibrator 180 after the making of the record of the surface is completed.

The positive pulse $P_1$ that is generated by the lockout multivibrator 180 at time $t_0$ initiates the operation of the delay multivibrator 190. However, the negative pulse produced by the lockout multivibrator at the end of its period of operation does not affect the operation of the delay multivibrator.

The delay multivibrator 190 is also of the single-shot, or monostable type. When in its normal, or quiescent, state, the control tube $T_4$ is cut off and the other tube $T_5$ is conducting. The delay multivibrator 190 is operated instantaneously at the time that a positive pulse is applied to its input from the lockout multivibrator 180. However, the time interval or period of operation varies with the bias applied to the control grid of the control tube $T_4$. This bias is varied at the surface 25 by the operator through a phantom network, as more fully explained hereinafter. By virtue of the employment of a lockout multivibrator 180 at the input of the delay multivibrator, the delay is made independent of any deviations in the amplitude of the trigger pulse $P_0$, thus permitting accurate and reliable control of the delay time.

The output of the delay multivibrator 190 is taken off the anode of the control tube $T_4$ and is applied through a small capacitor $C_2$ to the input of the rectifier 200 so that, in effect, the output of the delay multivibrator is differentiated before being applied to the input of rectifier 200. With this arrangement, a negative pulse $P_3$ is applied to the input of the rectifier 200 at time $t_0$ as shown in graph $G_3$. Also, a positive pulse $P_4$ is applied to the input of the rectifier 200 at a time $t_1$ as determined by the bias applied to the control tube $T_4$.

The rectifier 200 is of the same type as the rectifier 170, being adapted to transmit only positive pulses from its input to its output without introducing any time delay.

The gating multivibrator 210 is also of the single-shot, or monostable, type. When in its normal or quiescent state the control tube $T_7$ is cut off and the other tube $T_8$ is conducting. The gating multivibrator 210 is operated instantaneously at the time that a positive pulse is applied to its input from the rectifier 200, causing its control tube $T_7$ to conduct and cutting off the other tube $T_8$. After a predetermined time interval determined by its circuit constants, the gating multivibrator 210 restores, cutting off control tube $T_7$ and causing the other tube $T_8$ to conduct. The output of the gating multivibrator is taken off the anode of the control $T_7$. For this reason a negative square wave $W_4$ is produced at the output of the gating multivibrator as shown in graph $G_4$, the voltage at the anode suddenly dropping at time $t_1$ and then suddenly returning to its normal full value at time $t_2$.

The gate control circuit 220 is in the form of an amplifier comprising tube $T_9$ which is adapted to amplify square waves of a duration at least as long as the duration $t_2 - t_1$ of the square wave appearing at the output of the gating multivibrator 210. Thus, the negative square wave $W_4$ appears in inverted form, that is as a positive square wave at output terminal 222, as indicated by graph $G_5$, but without inversion at output terminal 224 as indicated by graph $G_6$. The two gate channels 166 and 168 are in the form of D.C. amplifiers comprising triodes $T_{10}$ and $T_{11}$, respectively. The inputs of the two gate channels are connected respectively to the outputs of the two amplifier channels 150 and 152, respectively, and the outputs of the two gate channels are connected in parallel and are applied to the input of the phase inverter 162. The two triodes $T_{10}$ and $T_{11}$ are provided with cathode resistors $R_3$ and $R_4$, respectively. The end of cathode resistor $R_3$, which is connected to the cathode of triode $T_{10}$ is connected to the anode of triode $T_9$ of the gate control circuit 220 through a coupling condenser $C_3$, but the end of the resistor $R_4$ that is connected to the cathode of triode $T_{11}$ is connected directly to the cathode of triode $T_9$ of the gate control circuit 220. The remaining ends of the two cathode resistors $R_3$ and $R_4$ are grounded and the control grid of the triode $T_9$ is connected through ground to input resistors $R_3$ and $R_4$. With this arrangement, a positive square wave $W_5$ is applied to the cathode of triode $T_{10}$ during time interval $t_1$, $t_2$, and a negative square wave $W_6$ is applied to the cathode of triode $T_{11}$ during this same time interval. Thus, gate channel 166 is normally open except during time interval $t_1$, $t_2$, and gate channel 168 is normally closed except during this same time interval.

As previously mentioned, trains of seismic waves generated by the transmitter 102 are radiated into the surrounding medium. These waves enter the formations that form the wall of the well in which the well unit is located. Each train of seismic waves emitted by the transmitter 102 as indicated by graph $G_0$ is transmitted along the walls of the well downwardly to the hydrophones $X_1$ and $X_2$, the waves indicated by graph $W_1$ being received by the upper hydrophone $X_1$ at one time and the same waves indicated by graph $W_2$ with only slight modification being received by the lower hydrophone at a later time, all as indicated in the upper part of FIG. 7.

As previously mentioned, just prior to the time a train of seismic waves $G_0$ is generated by the transmitter 102, a trigger pulse $P_0$ is produced. This trigger pulse $P_0$ is transmitted to the surface over the trigger pulse conductors 30 and 32 and is also employed to actuate the switching circuit $S_1$ in the well unit. By properly setting the time delay $t_1 - t_0$, the first switching circuit $S_1$ operates to apply the early-arrival signals $W_1$ from the upper hydrophone $X_1$ to the signal conductors 34 and 35 during the time interval $t_0$, $t_1$, that is while the upper gating channel 166 is open, and to apply the early-arrival signals $W_2$ from the lower hydrophone $X_2$ to the same conductors 34 and 35 during the time interval $t_1$, $t_2$, that is while the lower gating channel 168 is open. After time $t_2$ the switching circuits $S_1$ return to their quiescent state and are in a condition to repeat the cycle. Later at time $t_3$, the lockout multivibrator 180 returns to its quiescent state thus completing the preparation of the circuits in the well unit for operation the next time that the transmitter 102 operates. The signals applied from the two hydrophones $X_1$ and $X_2$ to the common pair of conductors 34 and 35 as well as the trigger pulse $P_0$ are transmitted to the recording system at the surface through the cable 10.

The manner in which the bias of the delay multivibrator 190 is controlled in order to switch the connections of the two hydrophones 104 and 106 to the signal conductors 34 and 35 at the times that the waves are reaching the hydrophones is described in detail hereinafter.

The purpose of the amplitude limiter 158 is to preclude the amplitude of signals applied to the input of the upper gate channel 166 from being so large that they would be transmitted through the upper gate channel 166 during intervals while this gate channel is closed. Unless such an amplitude limiter 158 is employed, there is some danger that large, or strong, signals arriving at the upper hydrophone 104 at the same time that waves are first arriving at the lower hydrophone 106, would partially be transmitted through the upper gate channel 166 and would mask the first break and other early arrivals that are detected at the lower receiver 106.

By reference to graph $G_0$ in FIG. 7, it will be noted that the waves that enter the formations comprise two groups, a first group $G_0'$ of relatively small amplitude and a second group $G_0''$ of much larger amplitude. It is thus seen that if the velocity of the waves is such that waves of the second group arrive at the upper receiver 104 simultaneously with the arrival of the first break $FB_2$ at the lower receiver 106, great danger of masking of the type just mentioned exists. This danger is obviated by employing the amplitude limiter 158. As a matter of fact, the form of the waves arriving at the receivers 104 and 106, is somewhat more complex than that indicated in graph $G_0$. The arriving waves actually include some undesired low frequency components generated by the transmitter, and otherwise, prior to the time that the hammer 110 strikes the anvil 116. To fully appreciate the nature of the undesired low frequency waves arriving at the receivers, it is desirable to bear in mind that the detectors $X_1$ and $X_2$ are mounted in the lower portion of the casing 109 which is separated from the upper portion thereof by means of shock resistant resilient tubular member 115 as indicated in FIG. 3a and as described in detail in said copending patent application Serial No. 506,819, filed May 9, 1955, now Patent 2,993,553.

Some of the low frequency components arriving at the receivers 104 and 106 have their origin in the mechanical vibration produced by the motor 114. Other portions of the low-frequency components arriving at the receivers 104 and 106 have their origin in the dragging of the well unit 100 against the walls of the hole 20 through the liquid in the well. Still other portions of the low-frequency components have their origin in the reaction produced in the upper portion of the casing when the hammer 110 is released.

In order to prevent such low-frequency disturbances from overloading the amplifier channels 150 and 152 and to prevent such components from being transmitted to the recording system at the surface, the pre-amplifiers 154 and 156 are designed to have high-pass or band-pass filter characteristics. Such characteristics may be provided by employing high-pass filters 151 and 153 between the outputs of the pre-amplifiers 154 and 156, and the inputs of the voltage amplifiers 155 and 157. By setting the low frequency cutoff of these filters so as to discriminate against the aforementioned undesired signal components of low-frequency, the higher frequency useful signal components are transmitted to the oscilloscopes 240 and 260 free of disturbance therefrom. On the other hand, the low-frequency cutoff of these filters must not be so high as to discriminate against any useful components of the signals received by the receivers 104 and 106 and applied to the amplifier channels 150 and 152 respectively. It has been found that the low-frequency cutoff of the filters 151 and 153 should be at least as high as about 400 cps. and that it may be as high as 1000 cps. to achieve such results. By employing high-pass filters having such characteristics in the amplifier channels connected to the detectors 104 and 106, it becomes possible to detect accurately the first breaks and also to reproduce accurately other important components of the early arrivals to determine interval velocity and also to determine the nature of the material through which the waves have traveled. In this connection, also by recording the waves passed through such high frequency filters, it becomes possible after some experience, to recognize the nature of the material through which the waves have traveled. This is because of the fact that the frequency characteristics of the waves that have traveled through a bed, depend not only upon the velocity of travel of the waves through the bed, but also upon other characteristics of the material.

It will be recognized that so far as determining interval velocity is concerned, it is only necessary to record the first breaks $FB_1$ and $FB_2$ of the waves arriving at the detectors 104 and 106 and that the nature of the material in the formation opposite the well unit 100 at the level between the two receivers 104 and 106, may generally be determined by examination of the early arriving waves received at the lower detector 106 after the first break $FB_2$. However, in order to have some assurance that the formation between the two receivers is uniform, it becomes advantageous to set the switching time $t_1$ at a point as far as possible from the first break $FB_1$ of the waves arriving at the upper receiver 104 and as close as possible to the first break $FB_2$ of the waves received at the lower receiver 106.

It is also important to provide an arrangement in which no current is produced in the signal conductors 34 and 35 between the time $t_1$ that the gate channels 166 and 168 are switched and the time at which the first break $FB_2$ arrives at the lower receiver 106. This result is accomplished partly by employing two gate channels 166 and 168 that are balanced so that when each is operating, it produces the same D.C. plate current in its output when no signal is applied to its input. This result is also accomplished in part by designing the phase inverter 162 and the push-pull amplifier 164, the transformer 165 and the cables and other circuits that lead to the recording system at the surface so that they have a wide band-pass frequency characteristic that extends far enough into the low frequency range as to be capable of reproducing step functions accurately within the time intervals within which the system is required to respond. Thus, for example, when the total sweep time of the oscilloscope 260 equals 5 millisec., the low frequency cutoff of such a wide band system should be below about 100 c.p.s. In other words, the period corresponding to the low frequency cutoff should be at least about 2 to 4 times the time interval required for the beam to traverse the face of the recording oscilloscope 260.

The upper frequency cutoffs of all the filter characteristics should be at least 5000 c.p.s. and preferably about 15,000 to 20,000 c.p.s. in order that the character of the waves received by the detectors 104 and 106 may be faithfully recorded so that the instants of inception of the first breaks $FB_1$ and $FB_2$ may be accurately determined.

It thus appears that in order to produce high quality records at the surface, it is desirable to employ, in effect, high-pass or band-pass filters in the amplifier channels 150 and 152 prior to the gating circuit 160 and also wide band-pass filter in the channel after the gating circuit 160 but that the low frequency cutoff of the second filter should be lower than the low frequency cutoff of the first filters. By employing circuits having such frequency characteristics in the well unit, records may be made at the surface which are suitable for making accurate measurements of interval velocities.

Figure 9:
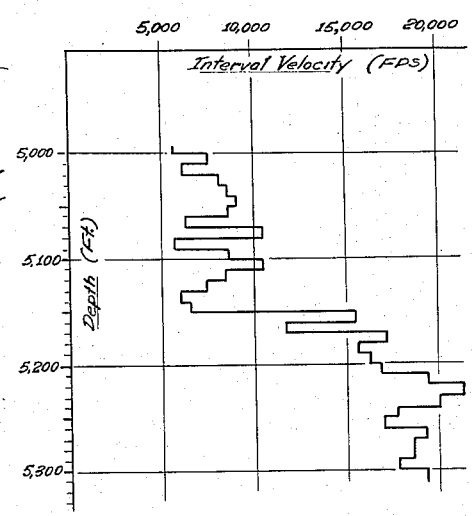
FIG. 9 is a graph showing an example of how interval velocity varies with depth over a selected depth range.

By virtue of the fact that the motor 114 is driven continuously, the process of generating and receiving seismic waves and transmitting a trigger pulse and also electric waves corresponding to the received seismic waves to the surface is repeated periodically at regular intervals. In practice, the well unit is either raised or lowered continuously at a relatively slow rate compared to the velocities of the seismic waves so that seismic waves are repeatedly generated at regular closely-spaced depth intervals in the well. As a result, a substantially continuous series of measurements of the seismic wave velocity characteristics of the formations intersected by the well is obtained. As more fully explained hereinafter, the records that are made are related with the depths to which the records correspond, so that a log of seismic wave velocity versus depth is produced. An illustration of the type of log obtained is shown in FIG. 9. For this particular example, the distance between the receivers 104 and 106 was ten feet and measurements of interval velocity were made at corresponding ten foot intervals in accordance with the method described and clamed in copending patent application Serial No. 506,819, filed May 9, 1955, now Patent 2,993,553. Hence, the log exhibits a step-wise characteristic for every ten foot change in depth, each step corresponding to a particular interval velocity measurement made at a particular depth in the well.

As previously explained the trigger pulse $P_0$ is transmitted to the recording truck 24 over conductors 30 and 32 and the early arrivals, including the first breaks, of the signals arriving at the hydrophones 104 and 106 are transmitted to the recording truck over the signal conductors 34 and 35. The trigger pulse arriving at the surface is employed to initiate the operation of a second switching system $S_2$ in order to operate the recording system to provide records of the time break and the first breaks and the early arrivals.

Figure 2B:
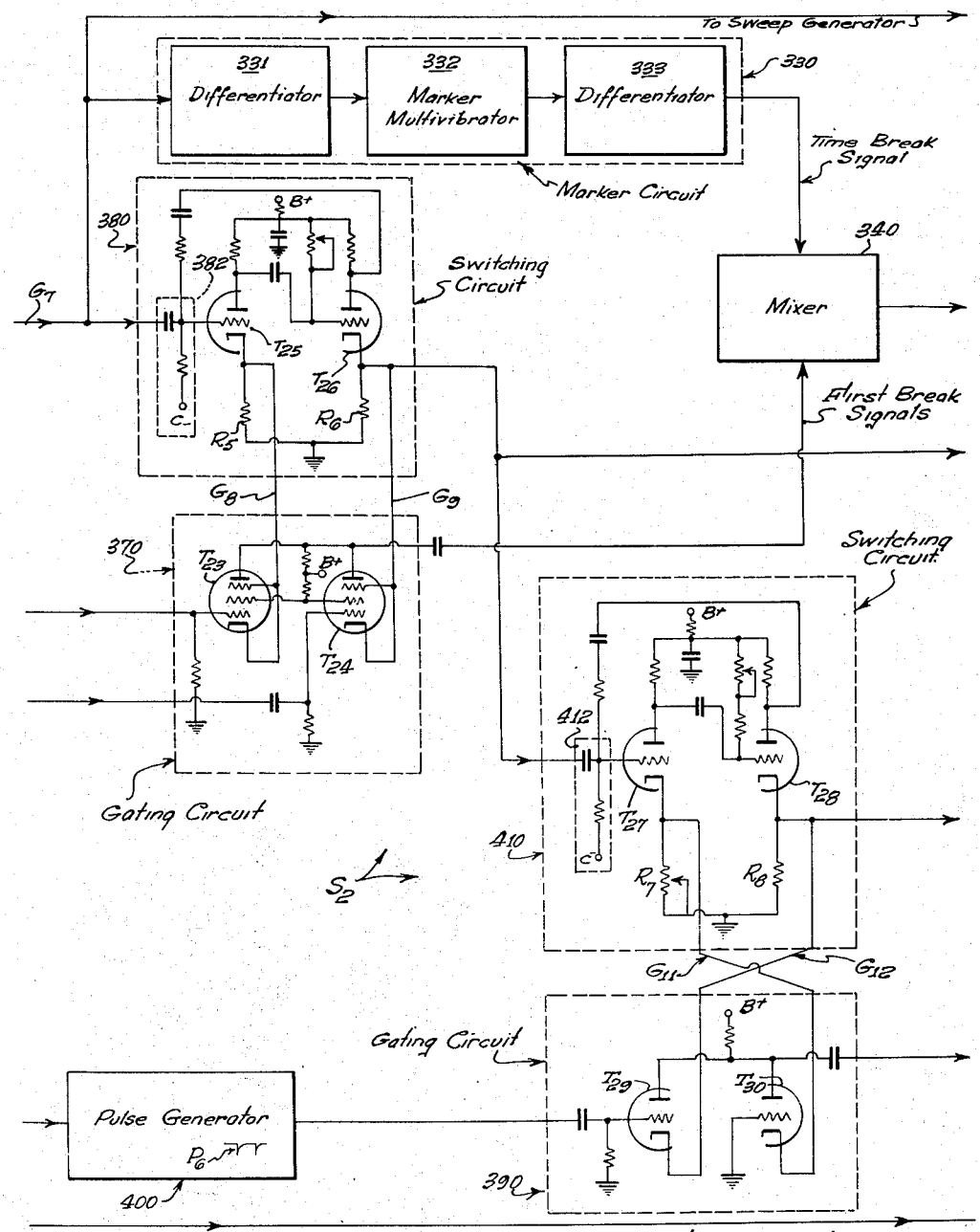
Figure 4A:
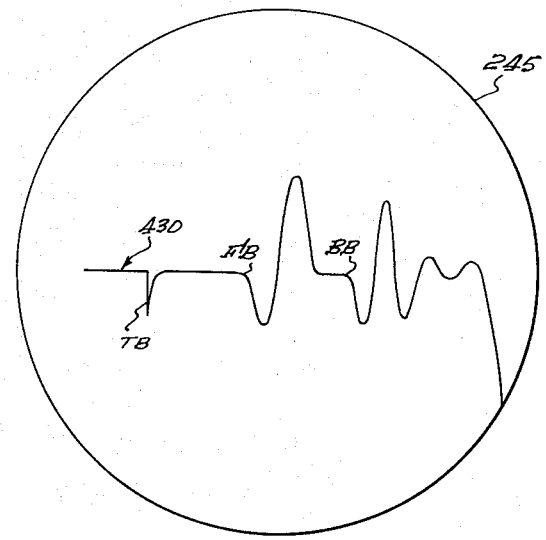
FIG. 4a is a view of a trace on the screen of the monitor oscilloscope.
Figure 4B:
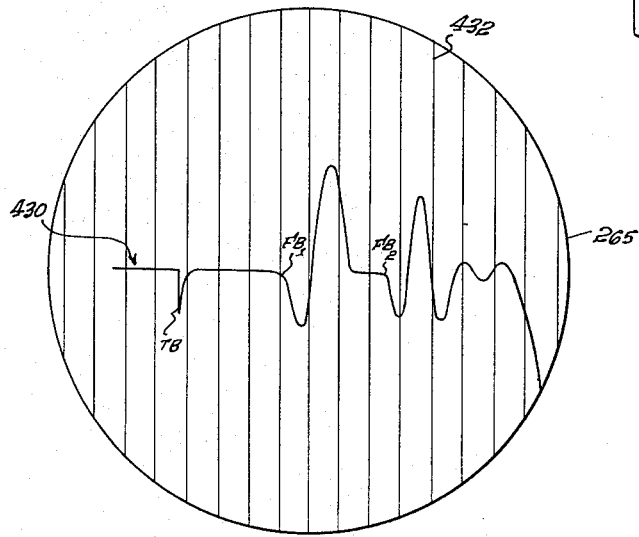
FIG. 4b is a view of the screen of the recording oscilloscope showing both the oscillograph trace and timing lines.

As shown in FIGS. 2a, 2b and 2c, the recording system comprises two oscilloscopes, namely, a monitor oscilloscope 240 and a recording oscilloscope 260. Examples of the waves produced by the two oscilloscopes 240 and 260 are shown in FIGS. 4a and 4b respectively. The monitor oscilloscope 240 is employed for examining the waves visually, namely, the time brake TB and the first breaks $FB_1$ and $FB_2$ and other early arrivals, parts of the early arrivals $W_1$ and $W_2$ in order to determine that the waves are being properly generated, received, detected, and recorded and more particularly to determine that the switching unit $S_1$ in the well unit 100 is operating properly so that both early arriving waves being received at the upper hydrophone 104 and early arriving waves being received by the lower hydrophone 106 are being detected and transmitted over the signal conductors 34 and 35 to the recording truck 24. The recording oscilloscope 260 is employed for making a record of the time break TB and each of the first breaks $FB_1$ and $FB_2$ and other early arrivals at both receivers, each time that a train of seismic waves is transmitted into the formations by the seismic wave transmitter 102. As more fully described hereinbelow, the recording oscilloscope 260 is of a type in which a photograph is made of the waves displayed on a fluorescent screen each time that a train of seismic waves is generated by the transmitter 102 and received by the hydrophones 104 and 106. Also, as more fully explained hereinafter, the recording system provides a set of timing lines 432 which are also photographed in order to facilitate the accurate measurement of the relative times at which the time break TB and the first breaks $FB_1$ and $FB_2$ occur.

The trigger pulse $P_0$ produced by each operation of the hammer mechanism 102 travels to the surface via conductors 30 and 32. At the surface the pulse $P_0$ is passed through half wave rectifier 300 and thence to the input of the input multivibrator 310. The input multivibrator 310 is of the monostable one-shot type which has a preferred quiescent condition. It is provided with a sensitivity adjusting control 306 which determines the necessary amplitude of the trigger signal applied to the grid of triode $T_{21}$ to cause the input multivibrator to operate. In practice, it is found that the trigger pulse $P_0$, in traversing the length of the logging cable 10, may undergo variable amounts of distortion in the form of changes in shape or amplitude caused by the reactive and resistive effects of the cable. For any one particular logging operation, i.e., for a fixed length of logging cable, the distortion of the pulse $P_0$ is relatively constant and hence a single adjustment of the sensitivity control 306 will suffice to produce reliable operation. However, when the logging unit is connected with a different length of logging cable, it is sometimes found that a readjustment of the sensitivity control 306 of the input multivibrator 310 is necessary in order to establish reliable triggering of the latter.

The input multivibrator 310 serves in effect to "lockout" any electrical disturbances which might be transmitted up the trigger pulse conductor 32 after the initial trigger pulse $P_0$. Hence, so long as the input multivibrator is operated any later disturbances such as may be produced by multiple vibrations of the switch contacts 146, are prevented from causing any unwanted triggering of the switching circuits $S_2$. Thus, once the input multivibrator 310 has commenced to operate, any further pulses arriving on the conductor 32 have no effect on the operation of either the input multivibrator or the remainder of the switching circuits $S_2$ until after the input multivibrator is restored to its quiescent condition. In addition, the input multivibrator 310 always supplies a constant amplitude output pulse to trigger the remainder of the surface switching circuits $S_2$ thereby creating reliable reproducible operation of the latter circuits, even though the trigger pulse $P_0$ transmitted to the surface via the cable 10 may vary in shape or amplitude for any reason.

The trigger pulse $P_0$ is applied to the input of the half wave rectifier 300 through a coupling capacitor 301. The half wave rectifier 300 includes a crystal diode 302 for transmitting positive pulses from the input to the output. A resistor 303 is connected across the input and a thermionic diode 304 is employed across the output to prevent the accidental passage of negative pulses to the input of the input multivibrator 310. Therefore, once the input multivibrator 310 has commenced to operate it is not possible for later negative pulses applied from conductor 32 to restore the input multivibrator inadvertently to its quiescent condition.

The input multivibrator 310 is of the single-shot, or monostable, type described above. When in its normal or quiescent state the control tube $T_{21}$ is cut off and the output tube $T_{22}$ is conducting. The input multivibrator 310 is operated instantaneously at the time that a positive pulse is applied to its input from the output of the half wave rectifier 300. The input multivibrator 310 produces at the anode of each of the tubes $T_{21}$ and $T_{22}$ square waves which commence at time $t_0$ and which terminates at time $t_4$, where $$t_4 > t_2$$

The duration of these square waves is less than about half the interval between successive operations of the transmitter 102. However, the duration of these square waves is greater than the time required for the well unit switching system $S_1$ to return to its quiescent or normal condition after it has been operated by each trigger pulse. Expressed in other ways $$(t_4 - t_0) < t$$

where $t$ is the interval between successive trains of seismic waves generated by the transmitter 102, and $$(t_4 - t_0) > (t_2 - t_0)$$

In practice, the output of the input multivibrator 310 is differentiated, producing an initial pulse $P_5$ at its beginning and a terminal pulse $P_9$ at its end as indicated by graph $G_7$ of FIG. 8. Such differentiating action may be produced by employing a capacitor $C_4$ in conjunction with a resistor $R_4$ in the output lead that is connected to the anode of triode $T_{22}$, though as will be apparent to those skilled in the art, the differentiation may be accomplished by means of capacitors and resistors at the inputs of the controlled circuits. The initial pulse $P_5$ is employed for one set of purposes including initiation of the operation of the surface switching circuit $S_2$ and the terminal pulse $P_9$ is employed to actuate the camera control unit 320 as explained more fully hereinafter.

A positive initial pulse $P_5$ derived from the anode of the second triode $T_{22}$ of the input multivibrator 310 is applied directly to the sweep generator 242 that is associated with the monitor oscilloscope 240. The initial part of the square wave produced at the anode of the triode $T_{22}$ may be converted into the desired pulses $P_5$ by including a differentiating network (not shown) at the input of the sweep generator 242. A positive initial pulse $P_5$ derived from this same tube $T_{22}$ is employed to actuate the switching circuit $S_2$ so as to apply a trigger pulse to the sweep generator 262 associated with the recording oscilloscope 260 simultaneously with the application of the pulse $P_5$ to the first mentioned sweep generator 242.

The outputs of the two sweep generators 242 and 262 are applied to the horizontal, or scanning, plates 244 and 264 of the respective oscilloscopes 240 and 260, thus causing electron beams that are projected toward the screens 245 and 265 of the two oscilloscopes to be swept across these screens synchronously in a horizontal direction at about the same rate and commencing at about the same time. Signals representing the time break TB and the waves that are transmitted upwardly along the signal conductors 34 and 35 are applied to the vertical deflection plates 246 and 266 respectively as more fully explained hereinbelow, so that an observer watching the screen 245 of the monitor oscilloscope 240 is able to ascertain visually the character of the waves that are being reproduced simultaneously on the screen 265 of the recording oscilloscope 260.

In order to produce indications of the time break TB on the screens 245 and 265 of the two oscilloscopes 240 and 260, the signal appearing at the anode of the tube $T_{22}$ is passed through a marker circuit 330 and into a mixer circuit 340, the output of which is applied to amplifiers 247 and 267 which are connected to the vertical deflection plates 246 and 266 of the respective oscilloscopes 240 and 260. The marker circuit itself comprises a differentiator 331, a marker multivibrator 332, and an output differentiator 333, connected in the order named. The period of operation of the marker multivibrator 332 may be small, being, for example, about 0.001 second. In practice, the circuit constants of the marker multivibrator are adjusted so that its operating period is equal to the time interval elapsed between the instant of closure of switch contacts 146 by finger 148 and the instant that the anvil 116 is struck by the hammer 110. By employing such an arrangement a sharp time break pulse TB, indicated in graph $G_{10}$ of FIG. 8, is produced, that accurately indicates the instant the hammer 110 strikes the anvil 116 and thus the instant $t_0'$ of inception of the wave train $G_0$. However, the sweeps of the two oscilloscopes 240 and 260 are initiated at the instant $t_0$ of reception of the main trigger pulse $P_0$. Therefore, due to the delay introduced by the marker multivibrator 332, the time break pulse TB is not applied to the oscilloscope vertical deflection plates 246 and 266 until after the sweeps of the two oscilloscopes 240 and 260 have commenced to move across the oscilloscope faces 245 and 265 respectively. By thus commencing the sweeps proir to the time of application of the time break signal TB to the vertical deflection plates 266 and 268, the traces of the oscilloscopes become stabilized and are moved away from the distorted corner regions of the tube faces 246 and 265 before any critical information is displayed thereupon. This arrangement facilitates and enhances the accuracy with which measurements may be made of the times of travel of seismic waves from the transmitter 102 to the hydrophones 104 and 106.

The signals transmitted over the signal conductors 34 and 35 to the surface and also timing signals from a 100 kc. oscillator 350 are applied to the mixer 330 and thence to the amplifiers 247 and 267 through the surface switching circuit $S_2$. The electrical signals arriving at the surface over signal conductors 34 and 35 are applied through a transformer 362 to a cathode follower 360. A gain adjusting device in the form of a potentiometer 374 feeds the output of the cathode follower 360 to one input of a first surface gating circuit 370. The output of the 100 kc. oscillator 350 is applied directly to another input of the first surface gating circuit 370.

As shown in detail in FIG. 2b, the first surface gating circuit 370 comprises two amplifier tubes $T_{23}$ and $T_{24}$ having their outputs connected in parallel so that the output of either amplifier tube $T_{23}$ or $T_{24}$ may be applied to the mixer 340. Signals from the cathode follower stage 360 are applied to the control grid of one of these amplifier tubes $T_{24}$, while signals from the 100 kc. oscillator 350 are applied to the signal grid of the other of these amplifier tubes $T_{23}$. Bias is supplied to the amplifier tubes $T_{23}$ and $T_{24}$ from a first gate control switching circuit 380 so that each of the amplifier tubes $T_{23}$ and $T_{24}$ is cut off, while the other is in amplifying condition. The first gate control switching circuit 380, which is in the form of a single-shot monostable multivibrator, comprises first and second triodes $T_{25}$ and $T_{26}$. A common cathode resistor $R_5$ is employed for tubes $T_{23}$ and $T_{25}$ and a common cathode resistor $R_6$ is employed for the triodes $T_{24}$ and $T_{26}$ so that the output voltages of the multivibrator 380 that are produced across the respective cathode resistors $R_5$ and $R_6$, serve to control the bias of the tubes $T_{23}$ and $T_{24}$ respectively.

The single-shot monostable multivibrator 380 is of the type hereinbefore described in which the input tube $T_{25}$ is non-conducting and the second tube $T_{26}$ is conducting when the multivibrator is in its normal or quiescent state. When the voltage appearing at the anode of the tube $T_{22}$ of the input multivibrator 310 is driven positive by the application of a trigger pulse $P_0$ to the input multivibrator 310, a sharp positive pulse $P_5$ produced at the output of differentiating network 382 drives tube $T_{15}$ positive, causing it to conduct and to initiate the operation of the switching circuit 380 thereby producing two square waves across the resistors $R_5$ and $R_6$ as represented by the graphs $G_8$ and $G_9$ respectively. The circuit constants of the multivibrator 380 are so chosen that these square waves have a duration $t_5-t_0$ which is greater than the time required for seismic waves to travel from the transmitter 102 to the lowermost hydrophone 106, but is less than half the period of the square wave generated by the input multivibrator 340.

In the quiescent or normal state of the system, current flowing through resistor $R_6$ maintains tube $T_{24}$ cutoff, in effect closing the gate between the cathode follower 370 and the mixer 340. Also, when the system is in its normal or quiescent state no current flows through resistor $R_5$, thereby maintaining tube $T_{23}$ operative to transmit signals from the oscillator 350 to the mixer 340. But when the square waves represented by the graphs $G_8$ and $G_9$ are produced by the gate control switching circuit 380, the bias on tube $T_{24}$ is removed, thus opening a gate between the cathode follower 360 and the mixer 340 and a negative bias is applied to the tube $T_{23}$, thereby in effect closing the gate between oscillator 350 and mixer 340. Thus, in effect, the first gating circuit 370 comprises two gating channels that include the tubes $T_{23}$ and $T_{24}$ respectively. The second of these gate channels is open only while the multivibrator 380 is producing a square wave and the first of these gate channels is open only at other times.

A second gating circuit 390 is employed for periodically increasing the intensity of the electron beam being generated in the recording oscilloscope 260. A 10 kc. pulse generator 400 is driven by the oscillator 350, and in synchronism therewith, so that during the interval of time that signals from the oscillator 350 are being applied through the mixer 340 and the amplifier 367 to the vertical deflection plates 266 sharp negative pulses are applied to the input of the second gating circuit 390 at one-tenth of the frequency of the signal produced by the oscillator 350. The purpose of this arrangement is to provide for periodic brightening of the rapid vertical deflection of the trace of the recording oscilloscope 260. As a result in the specific arrangement described herein a series of accurately timed vertical timing lines or bars 432 appear at intervals of 0.0001 sec. on the screen 265 of the recording oscilloscope 260. For convenience, the pulses produced by the pulse generator 400 are hereinafter called "timing pulses" $P_6$.

A second gate control switching unit 410, which is controlled by the first gate control switching unit 380, is itself employed to control the second gating circuit 390. The second gate control switching circuit 410 employs two triodes $T_{27}$ and $T_{28}$, the first triode being cut off and the second triode $T_{28}$ being conducting when the apparatus is in its normal or quiescent state. The second gate control switching circuit 410 is similar to the first gate control switching circuit 380, also being a single-shot monostable multivibrator. Furthermore, the time constants of the two gate control switching circuits 380 and 410 are the same, so that when suitably triggered, they produce square wave pulses of about the same duration in their respective outputs, the total duration being less than about the time interval $t_4-t_0$ of the square wave generated in the input multivibrator 310. The negative square wave $W_9$ appearing across the resistor $R_6$ of the first gate control switching unit 380 is applied through a differentiating network 412 to the first triode $T_{27}$ of the second gate control switching circuit 410. The negative pulse impressed on the input triode $T_{27}$ at time $t_0$ has no effect, but the positive pulse impressed thereon at time $t_5$ renders triode $T_{27}$ conducting and cuts off triode $T_{28}$. Expressed in other words, the second switching circuit 410 is operated to initiate the generation of a positive square wave $W_{11}$ at the instant that the negative square wave $W_9$ produced by the first switching circuit 380 terminates. As indicated by graphs $G_{11}$ and $G_{12}$, square waves $W_{11}$ and $W_{12}$ appear across cathode resistors $R_7$ and $R_8$ that are connected to the respective triodes $T_{27}$ and $T_{28}$. With this arrangement, a positive square wave $W_{11}$ is produced each time the second gate control switching circuit 410 operates and a negative square wave $W_{12}$ is generated each time the second gate control switching circuit 410 operates.

The second gating circuit 390 comprises two triodes $T_{29}$ and $T_{30}$. The two triodes $T_{27}$ and $T_{30}$ employ the cathode resistor $R_7$ in common and the two triodes $T_{28}$ and $T_{29}$ employ the cathode resistor $R_8$ in common. When the system is in its normal or quiescent condition, a negative grid bias exists on triode $T_{29}$ and a zero bias on triode $T_{30}$, in effect maintaining the gating circuit 390 closed. But during the time that the second gate control switching circuit 410 is operating, the bias on triode $T_{29}$ is removed and bias is applied to triode $T_{30}$, opening the gating circuit 390.

In view of the foregoing explanation, it is clear that signals from the 100 kc. oscillator 350 are applied to the vertical deflection plates 266 of the recording oscilloscope 260 during the time interval $t_5$, $t_6$ and that during this interval the intensity of the electron beam striking the fluorescent screen 265 is periodically increased. In practice, the amplitude of the 100 kc. wave that is applied to the vertical deflection plates 266 is of such a value that at the speed at which the electron beam is being swept across the fluorescent screen 265, the intensity is so low that the beam is too weak to produce an image on the film employed for photographing the screen 265 except when the negative timing pulses $P_6$ are applied to the input of the gating circuit 390. Thus even though a 100 kc. wave is applied to the vertical deflection plates 266 timing lines appear on the final record only at the rate of 10 kc. Furthermore, the amplitude of the 100 kc. wave applied to the vertical deflection plates 266 is made so large that only a small part of the 100 kc. wave is reproduced on the screen 266. For this reason the timing lines that are recorded are nearly straight vertical lines rather than having a sinuous appearance.

It will be noted that the 100 kc. oscillator 350 serves a dual purpose. It supplies an accurately timed wave, the frequency of which is divided by ten in the 10 kc. pulse generator 400 thus providing the timing pulses $P_6$. It also supplies the vertical deflection signal for oscilloscope 260. For the latter purpose alone, it is evident that other suitably high frequency signals would suffice. For this latter purpose, it is only necessary to provide rapid vertical oscillatory deflections of the beam of oscilloscope 260, and to make these deflections visible periodically by means of accurately timed brightening pulses $P_6$. As disclosed herein, however, the precision 100 kc. oscillator 350 serves to provide both accurate timing and adequate deflection.

The outputs of the two gate control switching circuits 380 and 410 are employed to initiate the operation of the beam sweep generator 262 each time that a square wave is generated by either of these circuits, more particularly the square wave $W_9$ occurring across the resistor $R_6$ of the first gate control switching unit 380 is applied through a fist half wave rectifier 384 to a mixing circuit 420 and the voltage wave $W_{12}$ appearing across the resistor $R_8$ of the second gate control switching unit 410 is applied through a second half wave rectifier 414 to the mixing circuit 420. Each of the half wave rectifiers 384 and 414 includes a corresponding differentiating network 386 and 416 at its input and the rectifier elements 388 and 418 are so connected that negative pulses are passed to the mixing circuit 420 at the instant that square wave pulses are generated in the respective gate control switching units 380 and 410. More particularly a negative pulse is transmitted through the mixing circuit by the gate control switching unit 380 at time $t_0$, that is, at the time that triode $T_{26}$ is rendered nonconducting. Similarly, a negative pulse is transmitted through the mixing circuit 420 at time $t_5$, that is at the time that the triode $T_{28}$ is rendered nonconducting. Each time that a negative pulse is applied to the input of the beam sweep generator 262 by the mixing circuit 420, the beam of the recording oscilloscope 260 is swept horizontally across the fluorescent screen 265 by the output of the beam sweep generator 262.

With the system described hereinabove, a cycle of operation of the surface switching unit $S_2$ is initiated each time a trigger pulse $P_0$ is applied thereto from the well unit 100. At the instant of initiation of each cycle of operation, both the beam sweep generators 242 and 262 are operated and the beams in the two oscilloscopes 240 and 260 are swept horizontally across their respective fluorescent screens 245 and 265. By setting the amplitude of the outputs of the two sweep generators 242 and 262 at suitable values, the beams sweep horizontally across the two screens 245 and 265 during a time interval while the gate control switch 380 is operating, that is from time $t_0$ until time $t_5$. As a result, during this time interval the signals that are transmitted upwardly from the well unit 100 over the signal conductors 34 and 35 are displayed on the screens 245 and 265 of both oscilloscopes. At time $t_5$ the first gate control switching circuit 380 restores and the gate control switching circuit 410 operates. As a result, the beam of the recording oscilloscope 260 is again swept across its screen 265, through the beam of the monitor oscilloscope 240 remains stationary. Accordingly, during this second interval from $t_5$ to $t_6$, timer lines are displayed on the screen 265 of the recording oscilloscope. The general appearance of the two screens 245 and 265 during the entire cycle of operation is indicated in FIGS. 4a and 4b respectively. It will be noted from these figures that, in effect, the same oscillograph trace 430 appears on both screens 245 and 265, but that timer lines 432 appear only on the screen 265 of the recording oscilloscope. It will also be noted that the time break TB appears on both traces 430 and that the first breaks $FB_1$ and $FB_2$ produced at the inception or arrival of seismic waves at the two hydrophones 104 and 106 also appear on the two traces. Furthermore, it will be noted that a relatively quiet period appears on both traces just prior to the instants of recording of the two first breaks. It will also be noted that the zero level just prior to the receipt of the first break $FB_2$ at the lower receiver 106, is the same as the zero level just prior to the first break $FB_1$ arriving at the upper receiver 104. This result is achieved very largely by employing in the well unit, circuits having the high-pass or band-pass filter characteristics previously described herein.

The screen 245 of the monitor oscilloscope 240 is observed by the operator while the well unit 100 is being moved from one level to another in the well 20 but records are periodically made of the image appearing on the screen 265 of the recording oscilloscope as the well unit is being moved in the well. As the operator watches the screen 245, he manipulates the delay bias control unit 450 so as to adjust the time $t_1$ (see FIG. 7) to assure switching of the operative connection between the signal conductors 34, 35 from the output of the upper hydrophone 104 to the output of the lower hydrophone 106 at a time between the instants of arrival of the seismic waves at the respective hydrophones from the seismic wave source 102.

As shown in FIG. 2a, the bias adjusting network 450 is provided with two terminals 451 and 452. The former terminal being connected to grounded conductor 30 and the second terminal 452 being connected to the center tap of a resistor 453 that is connected across the two signal conductors 34 and 35. A corresponding terminal which supplies bias to the delay multivibrator 190 in the well unit (see FIG. 3b) is connected to the center tap of a resistor 192 that is connected across the two signal conductors 34, 35 in the well unit 100. Thus any voltage applied between terminals 451 and 452 of the bias adjusting network 450 is applied through the cable 10 to the delay multivibrator 190 to supply the bias thereto as explained previously. The time delay $t_1-t_0$ between the occurrence of a trigger pulse $P_0$ and the operation of the switching unit $S_1$ in the well unit is varied by adjusting this bias. The low-pass filter $F_1$ in the delay multivibrator 190, as well as the balanced character of the phantom network provided by signal conductors 34 and 35 and the connection to resistor 192, prevent the output signals of transformer 165 from affecting the delay multivibrator. For this purpose the filter $F_1$ has a cut-off frequency which is very low compared with the main frequency components of the signals being transmitted to the surface. A suitable cut-off frequency is 1 c.p.s.

The bias adjusting network 450 may be of any type which permits adjustment of the voltage between the terminals 451 and 452. In the specific form thereof illustrated, the bias adjusting network includes a condenser 454 connected across the terminals 451 and 452. The terminal 452 is connected to a three-tap switch 456, the taps 457, 458 and 459 of which are connected to different points of a resistor 460, one end of resistor 460 is connected to terminal 451. The other end of the resistor 460 is connected to a sliding contact 461 of a continuously variable potentiometer 462 which is supplied voltage from a battery 463. One end of the potentiometer 462 is connected to the terminal 451. With this arrangement if large changes in delay time $t_1-t_0$ are to be made, the switch 456 is manipulated, while if small changes are to be made, the sliding contact 461 is moved on the potentiometer 462. It is to be noted that by maintaining the fluorescent screen 245 of the monitor oscilloscope free of the timer lines 232, the trace 430 may be more readily inspected visually and hence the speed of adjusting the bias network 450 is maintained at a maximum. This is particularly desirable where sudden large changes in velocity of seismic waves are occurring when the well unit 100 is being moved continuously in the well 20.

The employment of the balanced network including the two signal conductors 34 and 35 and the two center-tapped resistors 435 and 192, prevents any interaction between the signal transmitting circuit and the bias adjusting network 450. Thus, signals transmitted from the well unit 100 to the recording system do not enter the bias adjusting network 450. Conversely, sudden changes in voltage across the output terminals 451 and 452 of the balance adjusting network caused by manipulation of the switch 456 or of the sliding contact 461 are not applied to the recording system through the transformer 372 or otherwise. By employing such a balanced network the two signal conductors 34 and 35 do double duty, thus making it possible to employ standard well-logging cables which, generally speaking, are provided with only a few conductors.

A depth indicator 500 operated by the winch 22 or by some other cable-metering device is located adjacent the screen 265 of the recording oscilloscope. This depth indicator 500 is employed to indicate the depths at which the well unit 100 is located from time to time. As the well unit 100 is raised or lowered in the well, the footage indication of the depth indicator 500 changes in a corresponding manner. A similar depth indicator 502 may, if desired, be located adjacent the face of the monitor oscilloscope 240. The latter depth indicator 502 may be observed from time to time to indicate at what depths very critical changes in velocity occur. Records of such depths and records of observations made at those depths as when the well unit 100 is being lowered in the well may be employed during a subsequent logging run made while the well unit is being withdrawn from the well to warn the operator when large changes must be made in the delay bias adjusting network 450 in order to assure recording of both first breaks $FB_1$ and $FB_2$.

In addition to the depth indicator 500, a data card 501 is also provided adjacent the recording oscilloscope 260. On the data card is written information relating to the name and location of the well being logged and the date of the operation.

Figure 5:
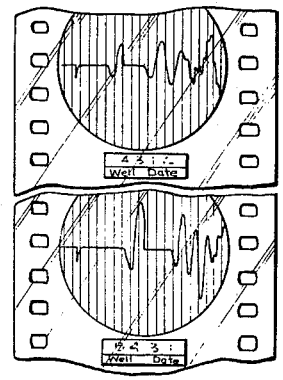
FIG. 5 is a representation of a section of a record made in accordance with the invention.

A mechanism for recording the various images successively displayed on the screen 265 of the recording oscilloscope 260 during each cycle of operation of the well unit 100 and the two switching circuits $S_1$ and $S_2$ is illustrated schematically in FIG. 2c. This system includes a camera 510 and a camera control unit 520. The camera employs a supply spool or reel 512 and a take-up spool or reel 514 for drawing a strip 516 of motion picture film past an image area in which a lens 518 focuses an image of the oscilloscope screen 265 and the depth indicator 500 and data card 501. The film 516 is advanced a predetermined distance in each cycle of operation so that a succession of images of the type illustrated in FIG. 5 is photographed in sequence along the length of the film. A segment of such a strip of film is shown in FIG. 5.

The recording oscilloscope 260 and the camera 516 are generally housed in a light-tight compartment (not shown). This compartment is provided with a shutter which may be opened without admitting excessive external light in order to inspect the image displayed on the screen 265 of the recording oscilloscope to determine whether the timing lines 342 are being properly produced.

The operation of the camera 510 is initiated by the operation of the camera control unit 520 each time $t_4$ that a positive pulse $P_9'$ (not shown) appears at the anode of tube $T_2$, of the input single-shot multivibrator 310. This pulse $P_9'$ is generated after both of the gate control switching units 380 and 410 have been restored to their normal or quiescent conditions and occurs simultaneously with pulse $P_9$ indicated in FIG. 8. The positive pulse $P_9'$ fires thyratron 522 thereby operating a relay 524 and energizing a lamp 526 adjacent the depth indicator 500 and data card 501. The lamp itself is energized substantially instantaneously at time $t_4$ and remains illuminated for a short interval of time as indicated by the shaded portion of graph $G_{13}$. The lamp 526 is actually in the form of a neon bulb and is energized through an RC circuit 528 so that it is energized substantially instantly but becomes de-energized after a very short period of time. The relay 526 closes after a predetermined delay. The rapid operation of the lamp 526 and the slight delay inherent in the operation of the relay 524 together, allow the image of the depth indicator 500 to be photographed on the film 516 and the lamp 526 to extinguish before the contacts 530 of relay 524 close. Hence the film driving motor 512 is not operated until all of the photographic information has been photographed on film 516.

The thyratron 522 is provided in its output with a condenser 532 and a resistor 534 which cause the thyratron to remain ignited for a pre-determined length of time, once it has been triggered by a positive pulse $P_9'$ applied to its input. The constants of the load circuit of the thyratron 522 are so selected that the thyratron is quenched before the next trigger pulse $P_0$ is generated. All the time that the thyratron 522 is ignited except for the small delay caused by the action of the relay 524, the motor 512 operates, thus advancing the film. As soon as the thyratron is quenched and the contacts 530 of the relay are opened and contacts 533 are closed, the motor stops. In order to assure rapid breaking action, the armature winding 513 of the motor is short circuited by closing of contacts 533 when the relay 524 is restored. The motor is operated by opening of the contacts 533 and the closing of contacts 530 at the time that the relay 524 is operated by ignition of the thyratron 522. The time delay produced by the relay is indicated by the shaded part of wave $W_{14}$ of graph $G_{14}$ and the time of operation of the motor is indicated by the clear part of wave $W_{14}$, the times of starting and stopping of the motor being $t_7$ and $t_8$ respectively.

Thus with the camera described, the film 516 is advanced at a time when no image is being displayed on the screen 265 of the recording oscilloscope 260. Conversely an image is displayed on the screen 265 of recording oscilloscope 260 and the depth indicator 500 and data card 501 are illuminated periodically only during intervals of time while the film 516 is at rest. It will be noted that even though the lamp 526 which illuminates the depth indicator 500 is operated very shortly after each display of an image on the screen 265, it would be possible to obtain satisfactory results if the depth indicator 500 and data card 501 were illuminated at other times while the film is stationary. The period of operation of the motor is adjusted to produce the sufficient movement of the film 516 between successive recordings of the traces appearing on the screen of the recording oscilloscope 260 and of the indications of the depth indicator 500 so that the records will not overlap. An example of the resulting film record is shown in FIG. 5.

In order to avoid any gaps in the velocity data for a well, the well unit is moved along the length of the well at such a rate that successive oscillograms are produced for successive portions of the well wall that are substantially contiguous or overlap. Thus, for example, when the spacing between the seismic wave receivers is 10 feet and the seismic wave source is operated at five-second intervals, the rate of raising or lowering of the well unit is set at about 2 ft. per sec. or lower. When set at the higher figure of 2 ft. per sec. first breaks are received at the two seismic wave receivers for waves that travel through successive contiguous 10 ft. intervals of the well wall between the receivers. When set at a lower value, first breaks in successive oscillograms are received for waves that travel through overlapping 10 ft. intervals of the well wall. When the seismic wave source is 10 ft. from the nearer receiver, then if a higher speed is employed which is less than 4.0 ft. per sec., some of the benefits of the invention may still be obtained, since the waves recorded in the oscillograms travel from the source to the farther receiver over successive 20 ft. intervals that overlap or are at least nearly contiguous. In practice, it is desirable to measure interval velocities over a wide range, such as one extending from a lower limit of about 5,000 ft. per sec. to an upper limit of about 25,000 ft. per sec. In such a case, the apparatus is designed so that the time elapsed between the time $t_0'$ of initiation of each train of seismic waves, and the time $t_1$ at which the signal conductors are switched from one receiver to another falls between about 0.5 millisec. and about 2.5 millisec. In order to produce suitable records, the beam sweep interval of the two oscilloscopes is usually set at about 5 millisec. The actual beam sweep time required must exceed the maximum time that may elapse between the time $t_0'$ of initiation of a train of seismic waves and the time of receipt of these waves at the receiver that is farther from the seismic wave source.

It is thus seen that with this invention a series of records may be made at different depths as a well unit is being moved in a well to supply data for determining the interval seismic wave velocity of the formations intersecting a well at different depths therein. Although one specific embodiment of the invention has been illustrated and described, it will be clear that the invention is not limited thereto but is capable of a variety of mechanical embodiments. Various changes which will now suggest themselves to those skilled in the art may be made in the material, form, details of construction, and arrangement of the elements without departing from the principles of the invention. Reference is therefore made to the appended claims to ascertain the scope of the invention.

The invention claimed is:

1. In a system for logging wells in which a seismic wave source and a pair of seismic wave receivers are arranged at mutually spaced points in a well, and in which waves generated at said source are detected at said receivers after transmission through formations into which the well extends, the improvement which comprises:
   means for operating said source to cause a train of seismic waves to be emitted therefrom and into the neighboring formations;
   a pair of signal conductors for transmitting to the surface waves detected by said receivers;
   switching means for selectively connecting one or the other of said receivers to said pair of signal conductors;
   time-delay means adapted to produce a control pulse a predetermined time after operation, said predetermined time being determined by a control voltage applied to said time-delay means;
   a variable voltage source located at the surface and connected to said time-delay means for varying the voltage applied thereto to establish said predetermined time interval;
   means controlled by such control pulse for operating said switching means to disconnect said one receiver from said pair of conductors and to connect the other receiver thereto, whereby waves arriving successively at said receivers after travel thereto from said source are separately transmitted over said pair of conductors;
   and means operated by said source-actuating means each time said source is operated for operating said time-delay means.

2. In a system for logging wells in which a seismic wave source and a pair of seismic wave receivers are arranged at mutually spaced points in a well, and in which waves generated at said source are detected at said receivers after transmission through formations into which the well extends, the improvement which comprises:
   means for operating said source to cause a train of seismic waves to be emitted therefrom and into the neighboring formations;
   a pair of signal conductors for transmitting to the surface waves detected by said receivers;
   switching means for selectively connecting one or the other of said receivers to said pair of signal conductors;
   a trigger pulse source;
   means for operating said trigger pulse source in predetermined time relationship with the operation of said seismic wave source to produce a trigger pulse;
   time-delay means operated by a trigger pulse to produce a control pulse a predetermined time interval after such trigger pulse is applied thereto, said predetermined time being determined by a control voltage applied to said time-delay means;
   a variable voltage source located at the surface and connected to said time-delay means for varying the voltage applied thereto to establish said predetermined time interval;
   and means controlled by such control pulse for operating said switching means to disconnect said one receiver from said pair of conductors and to connect the other receiver thereto, whereby waves arriving successively at said receivers after travel thereto from said source are separately transmitted over said pair of conductors.

3. In a system for logging wells in which a seismic wave source and a pair of seismic wave receivers are arranged at mutually spaced points in a well, and in which waves generated at said source are detected at said receivers after transmission through formations into which the well extends, the improvement which comprises:
   means for operating said source to cause a train of seismic waves to be emitted therefrom and into the neighboring formations;
   a pair of signal conductors for transmitting to the surface waves detected by said receivers;
   switching means for selectively connecting one or the other of said receivers to said pair of signal conductors;
   a trigger pulse source;
   means for operating said trigger pulse source in predetermined time relationship with the operation of said seismic wave source to produce a trigger pulse;
   time-delay means operated by a trigger pulse to produce a control pulse a predetermined time interval after such trigger pulse is applied thereto, said predetermined time being determined by a control voltage applied to said time-delay means;
   a voltage source located at the surface;
   means for connecting said pair of conductors as a conductor of a phantom circuit between said voltage source and said time-delay means, whereby said predetermined time interval is established;
   means located at the surface for varying the voltage applied from said voltage source to said phantom circuit;
   and means controlled by such control pulse for operating said switching means to disconnect said one receiver from said pair of conductors and to connect the other receiver thereto, whereby waves arriving successively at said receivers after travel thereto from said source are separately transmitted over said pair of conductors.

4. In a system for logging wells in which a seismic wave source and a pair of seismic wave receivers are arranged at mutually spaced points in a well, and in which waves generated at said source are detected at said receivers after transmission through formation into which the well extends, the improvement which comprises:
   means for operating said source to cause a train of seismic waves to be emitted therefrom and into the neighboring formations;
   a pair of signal conductors for transmitting to the surface waves detected by said receivers;
   switching means for selectively connecting one or the other of said receivers to said pair of signal conductors;
   a trigger pulse source;
   means for operating said trigger pulse source in predetermined time relationship with the operation of said seismic wave source to produce a trigger pulse;
   a mono-stable multi-vibrator adapted to be operated temporarily in response to a pulse applied thereto, said mono-stable multi-vibrator including means whereby it is restored at a predetermined time interval after operation by a delay interval determined by a bias voltage applied thereto;
   a bias voltage source located at the surface;
   means for connecting said pair of conductors as a conductor of a phantom circuit between said bias voltage source and said mono-stable multi-vibrator, whereby said predetermined time interval is established;
   means located at the surface for varying the bias applied from said bias voltage source to said phantom circuit;
   and means controlled by such control pulse for operating said switching means to disconnect said one receiver from said pair of conductors and to connect the other receiver thereto, whereby waves arriving successively at said receivers after travel thereto from said source are separately transmitted over said pair of conductors.

5. In a well testing system, wherein signals generated by a signal source in a well are detected by a receiver in the well and are transmitted over a pair of conductors to a signal-responsive device at the surface, the improvement comprising the combination of:

a voltage source at the surface;

control means located in the well adjacent said signal source for rendering said receiver operative to transmit said signals over said conductors at a time that varies in accordance with the voltage applied to said means;

means for connecting said pair of conductors as a conductor of a phantom circuit between said voltage source and said control means;

and means located at the surface for varying the voltage supplied from said voltage source to said phantom circuit.

6. In combination:

a device adapted to be lowered into a well that extends into the earth, said device being adapted to detect a specific type of event occurring in the earth and to produce an electrical signal in accordance with said event;

a pair of conductors connected between said device and the surface;

a voltage source at the surface of the earth;

control means located in the well adjacent said device for operating said device at a predetermined time interval after the occurrence of an event, said predetermined time interval being established in accordance with the voltage applied to said control means;

means for connecting said pair of conductors as a conductor of a phantom circuit between said voltage source and said control means;

means located at the surface for varying the voltage applied to said phantom circuit to vary said predetermined time interval;

and means for causing such event to occur.

7. In combination:

a device adapted to be lowered into a well that extends into the earth, said device being adapted to detect a specific type of event occurring in the earth and to produce an electrical signal in accordance with said event;

a pair of conductors connected between said device and the surface;

a voltage source at the surface of the earth;

control means located in the well adjacent said device for operating said device at a predetermined time interval after the occurrence of an event, said predetermined time interval being established in accordance with the voltage applied to said control means;

means for connecting said pair of conductors as a conductor of a phantom circuit between said voltage source and said control means;

means located at the surface for varying the voltage applied to said phantom circuit to vary said predetermined time interval;

and means for causing such event to occur periodically at regular intervals.

8. In a system for logging wells in which a seismic wave source and a pair of seismic wave receivers are arranged at mutually spaced points in a well, and in which waves generated at said source are detected at said receivers after transmission through formations into which the well extends, the improvement which comprises:

means for operating said source to cause a train of seismic waves to be emitted therefrom and into the neighboring formations;

output signal circuit means located in the well;

a pair of signal conductors leading from said output signal circuit means to the surface;

switching means operative to selectively connect one or the other of said receivers to said output signal circuit means;

time-delay means adapted to operate said switching means a predetermined time after operation, said predetermined time being determined by a control voltage applied to said time-delay means;

a voltage source located at the surface;

means for connecting said pair of conductors as a conductor of a phantom circuit between said voltage source and said time-delay means, whereby said predetermined time interval is established;

means located at the surface for varying the voltage applied from said voltage source to said phantom circuit;

means operated in synchronism with the operation of said seismic wave source for operating said time-delay means;

and means connecting said output signal circuit means to said pair of conductors for transmitting to the surface an indication of the time elapsed between the arrival of first breaks at the respective receivers.

9. In a system for logging wells in which a seismic wave source and a pair of seismic wave receivers are arranged at relatively stationary mutually spaced points and are moved in unison along the length of a well, and in which waves generated at said source are detected at said receivers after transmission through formations into which the well extends, the improvement which comprises:

source-actuating means for periodically operating said source during the movement of said source and receivers in the well to cause trains of seismic waves to be periodically emitted therefrom and into the neighboring formations at intervals greater than that required for the waves to travel from said source to the farther receiver along the wall of the well;

output signal circuit means located in the well;

a pair of signal conductors leading from said output signal circuit means to the surface;

switching means operative to selectively connect one or the other of said receivers to said output signal circuit means;

time-delay means adapted to operate said switching means a predetermined time after operation, said predetermined time being determined by a control voltage applied to said time-delay means;

a voltage source located at the surface;

means for connecting said pair of conductors as a conductor of a phantom circuit between said voltage source and said time-delay means, whereby said predetermined time interval is established;

means located at the surface for varying the voltage applied from said voltage source to said phantom circuit;

means operated by said source-actuating means each time said source is operated for operating the said time-delay means;

means connecting said output signal circuit means to said pair of conductors for transmitting to the surface an indication of the time elapsed between the arrival of first breaks at the respective receivers each time said source is operated;

and means located at the surface for making separate recordings of such indications and for recording the depth corresponding to each such indication.

10. In a system for logging wells in which a seismic wave source and a pair of seismic wave receivers are arranged at mutually spaced points in a well, and in which waves generated at said source are detected at said receivers after transmission through formations into which the well extends, and in which the waves detected by the respective receivers are recorded at the surface, the improvement which comprises:
  means for operating said source to cause a train of seismic waves to be emitted therefrom and into the neighboring formations;
  a cathode ray oscilloscope at the surface, said oscilloscope having vertical beam deflection means and horizontal beam deflection means;
  means for recording an image displayed on said oscilloscope;
  an oscillator;
  means operated in synchronism with the passage of seismic waves past one of said receivers for applying signals from said receivers to said vertical deflection means during a first predetermined time interval, and signals from said oscillator to said vertical deflection means during a second predetermined time interval;
  and means for applying beam sweep voltages to said horizontal deflection means at a predetermined rate, both while signals from said receivers are applied to said vertical deflection means and also while signals from said oscillator are applied to said vertical deflection means.

11. In a system for logging wells in which a seismic wave source and a pair of seismic wave receivers arranged at mutually spaced points are moved in unison along the length of a well, and in which waves generated at said source are detected at said receivers after transmission through formations into which the well extends, and in which the waves detected by the respective receivers are recorded at the surface, the improvement which comprises:
  source-actuating means for periodically operating said source during the movement of said source and receivers in the well to cause trains of seismic waves to be periodically emitted therefrom and into the neighboring formations at intervals greater than that required for the waves to travel from said source to the farther receiver along the wall of the well;
  a cathode ray oscillograph at the surface, said oscillograph comprising an oscilloscope and strip advancing means for feeding a photographic strip past a photographic exposure zone associated therewith, said oscilloscope having vertical beam deflection means and horizontal beam deflection means;
  means for recording an image displayed on said oscilloscope;
  an oscillator;
  means operated by said source-actuating means each time said source is operated for applying signals from said receivers to said vertical deflection means during a first predetermined time interval, and signals from said oscillator to said vertical deflection means during a second predetermined time interval;
  means operated by said source-actuating means each time said source is operated for applying beam sweep voltages to said horizontal deflection means at a predetermined rate, both while signals from said receivers are applied to said vertical deflection means and also while signals from said oscillator are applied to said vertical deflection means;
  and means operated by said source-actuating means for operating said advancing means each time said source is operated and after signals resulting from such operation of said source have been photographed in said oscillograph to advance an unexposed part of said strip into said exposure zone and for holding said part of said strip stationary in said zone while signals resulting from the next operation of said source are being photographed in said oscillograph.

12. In a system for logging wells in which a seismic wave source and a pair of seismic wave receivers arranged at mutually spaced points are moved in unison along the length of a well, and in which waves generated at said source are detected at said receivers after transmission through formations into which the well extends, and in which the waves detected by the respective receivers are recorded at the surface, the improvement which comprises:
  source-actuating means for periodically operating said source during the movement of said source and receivers in the well to cause trains of seismic waves to be periodically emitted therefrom and into the neighboring formations at intervals greater than that required for the waves to travel from said source to the farther receiver along the wall of the well;
  a cathode ray oscillograph at the surface, said oscillograph including advancing means for feeding a photographic strip past a photographic exposure zone associated therewith, said oscillograph having beam intensity control means, vertical beam deflection means, and horizontal beam deflection means, a trace displayed on the screen of said oscillograph not being viewable during recording thereof;
  a high-frequency oscillator;
  means controlled by said oscillator for generating timing pulses at a frequency that is a submultiple of said high frequency;
  means operated by said source-actuating means each time said source is operated for applying signals from said receivers to said vertical deflection means during a first predetermined time interval, and signals from said oscillator to said vertical deflection means during a second predetermined time interval;
  means for applying said timing pulses to said intensity control means to produce timing lines on said oscillograph at said submultiple frequency;
  means operated by said source-actuating means each time said source is operated for applying beam sweep voltages to said horizontal deflection means at a predetermined rate, both while signals from said receivers are applied to said vertical deflection means and also while signals from said oscillator are applied to said vertical deflection means;
  and means operated by said source-actuating means for operating said advancing means each time said source is operated and after signals resulting from such operation of said source and said timing lines have been photographed in said oscillograph to advance an unexposed part of said strip into said exposure zone and for holding said part of said strip stationary in said zone, while signals and timing lines resulting from the next operation of said source are being photographed in said oscillograph.

13. In a system for logging wells in which a seismic wave source and a pair of seismic wave receivers arranged at mutually spaced points are moved in unison along the length of a well, and in which waves generated at said source are detected at said receivers after transmission through formations into which the well extends, and in which the waves detected by the respective receivers are recorded at the surface, the improvement which comprises:
  source-actuating means for periodically operating said source during the movement of said source and receivers in the well to cause trains of seismic waves to be periodically emitted therefrom and into the neighboring formations at intervals greater than that required for the waves to travel from said source to the farther receiver along the wall of the well;
  a pair of signal conductors for transmitting to the surface waves detected by said receivers; switching means for selectively connecting one or the other of said receivers to said pair of signal conductors;
  means operated by said source-actuating means each time said source is operated for operating said switching means to disconnect one receiver from said pair of conductors and to connect the other receiver thereto, whereby waves arriving successively at said receivers are separately transmitted over said pair of conductors and then to reconnect said one receiver to said pair of conductors prior to the next operation of said source;

a cathode ray oscillograph at the surface, said oscillograph including advancing means for feeding a photographic strip past a photographic exposure zone associated therewith, said oscillograph having vertical beam deflection means and horizontal beam deflection means;

an oscillator;

means operated by said source-actuating means each time said source is operated for applying signals from said receivers to said vertical deflection means during a first predetermined time interval, and signals from said oscillator to said vertical deflection means during a second predetermined time interval;

means operated by said source-actuating means each time said source is operated for applying beam sweep voltages to said horizontal deflection means at a predetermined rate, both while signals from said receivers are applied to said vertical deflection means and also while signals from said oscillator are applied to said vertical deflection means;

and means operated by said source-actuating means for operating said advancing means each time said source is operated and after signals resulting from such operation of said source have been photographed in said oscillograph to advance an unexposed part of said strip into said exposure zone and for holding said part of said strip stationary in said zone while signals resulting from the next operation of said source are being photographed in said oscillograph.

14. In a system for logging wells in which a seismic wave source and a pair of seismic wave receivers arranged at mutually spaced points are moved in unison along the length of a well, and in which waves generated at said source are detected at said receivers after transmission through formations into which the well extends, and in which the waves detected by the respective receivers are recorded at the surface, the improvement which comprises:

source-actuating means for periodically operating said source during the movement of said source and receivers in the well to cause trains of seismic waves to be periodically emitted therefrom and into the neighboring formations at intervals greater than that required for the waves to travel from said source to the farther receiver along the wall of the well;

a pair of signal conductors for transmitting to the surface waves detected by said receivers; switching means for selectively connecting one or the other of said receivers to said pair of signal conductors;

means operated by said source-actuating means each time said source is operated for operating said switching means to disconnect one receiver from said pair of conductors and to connect the other receiver thereto, whereby waves arriving successively at said receivers are separately transmitted over said pair of conductors and then to reconnect said one receiver to said pair of conductors prior to the next operation of said source;

a cathode ray oscillograph at the surface, said oscillograph including advancing means for feeding a photographic strip past a photographic exposure zone associated therewith, said oscillograph having beam intensity control means, vertical beam deflection means, and horizontal beam deflection means, a trace displayed on the screen of said oscillograph not being viewable during recording thereof;

a cathode ray oscilloscope at the surface, said oscilloscope having vertical beam deflection means and horizontal beam deflection means, a trace displayed on the screen of said oscillograph being viewable;

an oscillator;

means operated by said source-actuating means each time said source is operated for applying signals from said signal conductors to both vertical deflection means during a first predetermined time interval, and for applying signals from said oscillator to the vertical deflection means of said oscillograph during a second predetermined time interval;

means operated by said source-actuating means each time said source is operated for applying beam sweep voltages to the horizontal deflection means of said oscillograph at a predetermined rate, both while signals from said signal conductors are applied to said vertical deflection means and also while signals from said oscillator are applied to said vertical deflection means and for applying beam sweep voltages to the horizontal deflection means of said oscilloscope while signals from said signal conductors are applied to said vertical deflection means;

and means operated by said source-actuating means for operating said advancing means each time said source is operated and after signals resulting from such operation of said source have been photographed in said oscillograph to advance an unexposed part of said strip into said exposure zone and for holding said part of said strip stationary in said zone while signals resulting from the next operation of said source are being photographed in said oscillograph.

15. In a system for logging wells in which a seismic wave source and a pair of seismic wave receivers arranged at mutually spaced points are moved in unison along the length of a well, and in which waves generated at said source are detected at said receivers after transmission through formations into which the well extends, and in which the waves detected by the respective receivers are recorded at the surface, the improvement which comprises:

source-actuating means for periodically operating said source during the movement of said source and receivers in the well to cause trains of seismic waves to be periodically emitted therefrom and into the neighboring formations at intervals greater than that required for the waves to travel from said source to the farther receiver along the wall of the well;

a pair of signal conductors for transmitting to the surface waves detected by said receivers; switching means for selectively connecting one or the other of said receivers to said pair of signal conductors;

means operated by said source actuating means each time said source is operated for operating said switching means to disconnect one receiver from said pair of conductors and to connect the other receiver thereto, whereby waves arriving successively at said receivers are separately transmitted over said pair of conductors and then to reconnect said one receiver to said pair of conductors prior to the next operation of said source;

a cathode ray oscillograph at the surface, said oscillograph including advancing means for feeding a photographic strip past a photographic exposure zone associated therewith, said oscillograph having beam intensity control means, vertical beam deflection means, and horizontal beam deflection means, a trace displayed on the screen of said oscillograph not being viewable during recording thereof;

a cathode ray oscilloscope at the surface, said oscilloscope having vertical beam deflection means and horizontal beam deflection means, a trace displayed on the screen of said oscillograph being viewable;

a high frequency oscillator;

means controlled by said oscillator for generating timing pulses at a frequency that is a submultiple of said high frequency;

means operated by said source-actuating means each time said source is operated for applying signals from said signal conductors to both vertical deflection means during a first predetermined time interval, and for applying signals from said oscillator to the vertical deflection means of said oscillograph during a second predetermined time interval;

means for applying said timing pulses to said intensity control means to produce timing lines on said oscillograph at said submultiple frequency;

means operated by said source-actuating means each time said source is operated for applying beam sweep voltages to the horizontal deflection means of said oscillograph at a predetermined rate, both while signals from said signal conductors are applied to said vertical deflection means and also while signals from said oscillator are applied to said vertical deflection means and for applying beam sweep voltages to the horizontal deflection means of said oscilloscope while signals from said signal conductors are applied to said vertical deflection means;

and means operated by said source-actuating means for operating said advancing means each time said source is operated and after signals resulting from such operation of said source and said timing lines have been photographed in said oscillograph to advance an unexposed part of said strip into said exposure zone and for holding said part of said strip stationary in said zone, while signals and timing lines resulting from the next operation of said source are being photographed in said oscillograph.

16. In a system for logging wells in which a seismic wave source and a pair of seismic wave receivers arranged at mutually spaced points are moved in unison along the length of a well, and in which waves generated at said source are detected at said receivers after transmission through formations into which the well extends, and in which the waves detected by the respective receivers are recorded at the surface, the improvement which comprises:

source-actuating means for periodically operating said source during the movement of said source and receivers in the well to cause trains of seismic waves to be periodically emitted therefrom and into the neighboring formations at intervals greater than that required for the waves to travel from said source to the farther receiver along the wall of the well;

a pair of signal conductors for transmitting to the surface waves detected by said receivers;

a pair of amplifier channels having their inputs connected to respective receivers, and having outputs;

a pair of gating circuits connecting the outputs of said amplifier channels to said pair of conductors;

means controlled by said source-actuating means each time said source is operated for selectively operating said gating circuits, whereby signals appearing in the outputs of said amplifier channels are applied to said pair of conductors while the first breaks of seismic waves generated by said source are being detected by the respective receivers;

a cathode ray oscillograph at the surface, said oscillograph including advancing means for feeding a photographic strip past a photographic exposure zone associated therewith, said oscillograph having beam intensity control means, vertical beam deflection means, and horizontal beam deflection means, a trace displayed on the screen of said oscillograph not being viewable during recording thereof;

a high-frequency oscillator;

means controlled by said oscillator for generating timing pulses at a frequency that is a submultiple of said high frequency;

means operated by said source-actuating means each time said source is operated for applying signals from said receivers to said vertical deflection means during a first predetermined time interval, and signals from said oscillator to said vertical deflection means during a second predetermined time interval;

means for applying said timing pulses to said intensity control means to produce timing lines in said oscillograph at said submultiple frequency;

means operated by said source-actuating means each time said source is operated for applying beam sweep voltages to said horizontal deflection means at a predetermined rate, both while signals from said receivers are applied to said vertical deflection means and also while signals from said oscillator are applied to said vertical deflection means;

and means operated by said source-actuating means for operating said advancing means each time said source is operated and after signals resulting from such operation of said source and said timing lines have been photographed in said oscillograph to advance an unexposed part of said strip into said exposure zone and for holding said part of said strip stationary in said zone, while signals and timing lines resulting from the next operation of said source are being photographed in said oscillograph.

17. In a system for logging wells in which a seismic wave source and a pair of seismic wave receivers are arranged at mutually spaced points in a well, and in which waves generated at said source are detected at said receivers after transmission through formations into which the well extends, and in which the waves detected by the respective receivers are recorded at the surface, the improvement which comprises:

means for operating said source to cause a train of seismic waves to be emitted therefrom and into the neighboring formations;

a pair of signal conductors for transmitting to the surface waves detected by said receivers;

switching means for selectively connecting one or the other of said receivers to said pair of signal conductors;

time-delay means adapted to produce a control pulse a predetermined time after operation, said predetermined time being determined by a control voltage applied to said time-delay means;

a variable voltage source located at the surface and connected to said time-delay means for varying the voltage applied thereto to establish said predetermined time interval;

means controlled by such control pulse for operating said switching means to disconnect said one receiver from said pair of conductors and to connect the other receiver thereto, whereby waves arriving successively at said receivers are separately transmitted over said pair of conductors;

first and second cathode ray oscillopscopes at the surface;

means for recording a first trace displayed on said first oscilloscope, a trace on said second oscilloscope being viewable while a trace displayed on said first oscilloscope is not viewable but is being recorded, each of said oscilloscopes having vertical beam deflection means and horizontal beam deflection means;

means for applying signals from said signal conductors to the vertical deflection means of both oscilloscopes;

and means for applying beam sweep voltages to the horizontal deflection means of both oscilloscopes simultaneously, whereby the received waves applied to said second oscilloscope may be viewed while those applied to said first oscilloscope are being recorded.

18. In a system for logging wells in which a seismic wave source and a pair of seismic wave receivers arranged at mutually spaced points are moved in unison along the length of a well, and in which waves generated at said source are detected at said receivers after transmission through formations into which the well extends, and in which the waves detected by the respective receivers are recorded at the surface, the improvement which comprises:

source-actuating means for periodically operating said source during the movement of said source and receivers in the well to cause trains of seismic waves to be periodically emitted therefrom and into the neighboring formations at intervals greater than that required for the waves to travel from said source to the farther receiver along the wall of the well;

a pair of signal conductors for transmitting to the surface waves detected by said receivers;

time-delay means adapted to produce a control pulse a predetermined time after operation, said predetermined time being determined by a control voltage applied to said time-delay means;

a variable voltage source located at the surface and connected to said time-delay means for varying the voltage applied thereto to establish said predetermined time interval;

means operated by said source-actuating means each time said source is operated for operating the said time-delay means; means responsive to each said control pulse for separately applying to said signal conductors at the lower end thereof waves generated by said seismic wave source and successively detected by said receivers;

first and second cathode ray oscilloscopes at the surface;

means for recording a first trace displayed on said first oscilloscope, a trace on said second oscilloscope being viewable while a trace displayed on said first oscilloscope is not viewable but is being recorded, each of said oscilloscopes having vertical beam deflection means and horizontal beam deflection means;

means operated by said source-actuating means each time said source is operated for applying signals from said signal conductors to said vertical deflection means;

and means operated by said source-actuating means each time said source is operated for applying beam sweep voltages to the horizontal deflection means of both oscilloscopes simultaneously, whereby the received waves applied to said second oscilloscope may be viewed while those applied to said first oscilloscope are being recorded.

19. In a system for logging wells in which a seismic wave source and a pair of seismic wave receivers are arranged at mutually spaced points in a well, and in which waves generated at said source are detected at said receivers after transmission through formations into which the well extends, and in which the waves detected by the respective receivers are recorded at the surface, the improvement which comprises:

means for operating said source to cause a train of seismic waves to be emitted therefrom and into the neighboring formations;

time-delay means adapted to produce a control pulse a predetermined time after operation, said predetermined time being determined by a control voltage applied to said time-delay means;

a voltage source located at the surface;

a cathode ray oscilloscope at the surface, said oscilloscope having vertical beam deflection means and horizontal beam deflection means;

means controlled by said control pulse for successively applying signals from said receivers to said vertical deflection plates;

means for applying beam sweep voltages to said horizontal deflection means at a predetermined rate while signals from said receivers are applied to said vertical deflection means;

and means for applying an adjustable voltage from said source to said time-delay means.

20. In a system for logging wells in which a seismic wave source and a pair of seismic wave receivers arranged at mutually spaced points are moved in unison along the length of a well, and in which waves generated at said source are detected at said receivers after transmission through formations into which the well extends, and in which the waves detected by the respective receivers are recorded at the surface, the improvement which comprises:

source-actuating means for periodically operating said source during the movement of said source and receivers in the well to cause trains of seismic waves to be periodically emitted therefrom and into the neighboring formations at intervals greater than that required for the waves to travel from said source to the farther receiver along the wall of the well;

time-delay means adapted to produce a control pulse a predetermined time after operation, said predetermined time being determined by a control voltage applied to said time-delay means;

means operated by said source-actuating means each time said source is operated for operating the said time-delay means;

a voltage supply located at the surface;

a cathode ray oscillograph at the surface, said oscillograph including advancing means for feeding a photographic strip past a photographic exposure zone associated therewith, said oscillograph having vertical beam deflection means and horizontal beam deflection means, a trace displayed on the screen of said oscillograph not being viewable during recording thereof;

a cathode ray oscilloscope at the surface, said oscilloscope having vertical beam deflection means and horizontal beam deflection means, a trace displayed on the screen of said oscillograph being viewable;

means controlled by said control pulse for successively applying signals from said receivers to both said vertical deflection means;

means operated by said source-actuating means each time said source is operated for applying beam sweep voltages to both horizontal deflection means simultaneously, whereby the received waves applied to said oscilloscope may be viewed while those applied to said oscillograph are being recorded;

means operated by said source-actuating means for operating said advancing means each time said source is operated and after signals resulting from such operation of said source have been photographed in said oscillograph to advance an unexposed part of said strip into said exposure zone and for holding said part of said strip stationary in said zone while signals resulting from the next operation of said source are being photographed in said oscillograph;

and means for applying an adjusatble voltage from said voltage supply to said time-delay means.

21. In a system for logging wells in which a seismic wave source and a pair of seismic wave receivers arranged at mutually spaced points are moved in unison along the length of a well, and in which waves generated at said source are detected at said receivers after transmission through formations into which the well extends, and in which the waves detected by the respective receivers are recorded at the surface, the improvement which comprises:

source-actuating means for periodically operating said source during the movement of said source and receivers in the well to cause trains of seismic waves to be periodically emitted therefrom and into the neighboring formations at intervals greater than that required for the waves to travel from said source to the farther receiver along the wall of the well;

a pair of signal conductors for transmitting to the surface waves detected by said receivers;

time-delay means adapted to produce a control pulse a predetermined time after operation, said predetermined time being determined by a control voltage applied to said time-delay means;

a voltage supply located at the surface;

means for connecting said pair of conductors as a conductor of a phantom circuit between said voltage supply and said time-delay means, whereby said predetermined time interval is established;

means operated by said source-actuating means each time said source is operated for operating the said time-delay means; means responsive to each said control pulse for separately applying to said signal conductors at the lower end thereof waves generated by said seismic wave source and successively detected by said receivers;

first and second cathode ray oscilloscopes at the surface;

means for recording a first trace displayed on said first oscilloscope, a trace on said second oscilloscope being viewable while a trace displayed on said first oscilloscope is not viewable but is being recorded, each of said oscilloscopes having vertical beam deflection means and horizontal beam deflection means;

means operated by said source-actuating means each time said source is operated for applying signals from said signal conductors to said vertical deflection means;

means operated by said source-actuating means each time said source is operated for applying beam sweep voltages to the horizontal deflection means of both oscilloscopes simultaneously, whereby the received waves applied to said second oscilloscope may be viewed while those applied to said first oscilloscope are being recorded;

and means located at the surface for varying the voltage applied from said voltage supply to said phantom circuit.

22. In a system for logging wells in which a seismic wave source and a pair of seismic wave receivers arranged at mutually spaced points are moved in unison along the length of a well, and in which waves generated at said source are detected at said receivers after transmission through formations into which the well extends, and in which the waves detected by the respective receivers are recorded at the surface, the improvement which comprises:

source-actuating means for periodically operating said source during the movement of said source and receivers in the well to cause trains of seismic waves to be periodically emitted therefrom and into the neighboring formations at intervals greater than that required for the waves to travel from said source to the father receiver along the wall of the well;

a pair of signal conductors for transmitting to the surface waves detected by said receivers;

time-delay means adapted to produce a control pulse a predetermined time after operation, said predetermined time being determined by a control voltage applied to said time-delay means;

a voltage supply located at the surface;

means for connecting said pair of conductors as a conductor of a phantom circuit between said voltage supply and said time-delay means, whereby said predetermined time interval is established;

means operated by said source-actuating means each time said source is operated for operating the said time-delay means; means responsive to each said control pulse for separately applying to said signal conductors at the lower end thereof waves generated by said seismic wave source and successively detected by said receivers;

a cathode ray oscillograph at the surface, said oscillograph including advancing means for feeding a photographic strip past a photographic exposure zone associated therewith, said oscillograph having beam intensity control means, vertical beam deflection means, and horizontal beam deflection means, a trace displayed on the screen of said oscillograph not being viewable during recording thereof;

a cathode ray oscilloscope at the surface, said oscilloscope having vertical beam deflection means and horizontal beam deflection means, a trace displayed on the screen of said oscillograph being viewable;

a high-frequency oscillator;

means controlled by said oscillator for generating timing pulses at a frequency that is a submultiple of said high frequency;

means operated by said source-actuating means each time said source is operated for applying signals from said signal conductors to both vertical deflection means during a first predetermined time interval and for applying signals from said oscillator to the vertical deflection means of said oscillograph during a second predetermined time interval;

means for applying said timing pulses to said intensity control means to produce timing lines in said oscillograph at said submultiple frequency;

means operated by said source-actuating means each time said source is operated for applying beam sweep voltages to the horizontal deflection means of said oscillograph at a predetermined rate, both while signals from said signal conductors are applied to said vertical deflection means and also while signals from said oscillator are applied to said vertical deflection means and for applying beam sweep voltages to the horizontal deflection means of said oscilloscope while signals from said signal conductors are applied to said vertical deflection means;

means located at the surface for varying the voltage applied from said voltage supply to said phantom circuit;

and means operated by said source-actuating means for operating said advancing means each time said source is operated and after signals resulting from such operation of said source and said timing lines have been photographed in said oscillograph to advance an unexposed part of said strip into said exposure zone and for holding said part of said strip stationary in said zone, while signals and timing lines resulting from the next operation of said source are being photographed in said oscillograph.

23. In combination with a source of signals, a cathode ray oscilloscope having beam intensity control means, vertical beam deflection means, and horizontal beam deflection means;

a high frequency oscillator;

means controlled by said oscillator for generating timing pulses at a frequency that is a submultiple of said high frequency;

means for applying signals from said source to said vertical deflection means during a first predetermined time interval but not during a second predetermined time interval;

means for applying signals from said oscillator to said vertical deflection means during said second predetermined time interval but not during said first predetermined time interval;

means for applying said timing pulses to said intensity control means during said second predetermined time interval to produce timing lines in said oscilloscope at said submultiple frequency;

and means for applying beam sweep voltages to said horizontal deflection means at a predetermined rate while signals from said source are applied to said vertical deflection means and also while signals from said oscillator are applied to said vertical deflection means.

24. In combination with a source that operates periodically to produce signals, a cathode ray oscilloscope having beam intensity control means, vertical beam deflection means, and horizontal beam deflection means;

a high frequency oscillator;

means controlled by said oscillator for generating timing pulses at a frequency that is a submultiple of said high frequency;

means for applying signals from said source to said vertical deflection means during a first predetermined time interval but not during a second predetermined time interval each time said source is operated;

means for applying signals from said oscillator to said vertical deflection means during said second predetermined time interval but not during said first predetermined time interval;

means for applying said timing pulses to said intensity control means during said second predetermined time interval to produce timing lines in said oscilloscope at said submultiple frequency;

means for applying beam sweep voltages to said horizontal deflection means at a predetermined rate while signals from said source are applied to said vertical deflection means and also while signals from said oscillator are applied to said vertical deflection means.

25. In combination with a source of signals, source-actuating means for operating said source periodically;

a cathode ray oscillograph having beam intensity control means, vertical beam deflection means, horizontal beam deflection means, and advancing means for feeding a photographic strip past a photographic exposure zone associated therewith;

a high-frequency oscillator;

means controlled by said oscillator for generating timing pulses at a frequency that is a submultiple of said high frequency;

means controlled by said source-actuating means for applying signals from said source to said vertical deflection means during a first predetermined time interval but not during a second predetermined time interval each time said source is operated;

means for applying signals from said oscillator to said vertical deflection means during said second predetermined time interval but not during said first predetermined time interval;

means controlled by said source-actuating means for applying said timing pulses to said intensity control means during said second predetermined time interval to produce timing lines in said oscillograph at said submultiple frequency;

means for applying beam sweep voltages to said horizontal deflection means at a predetermined rate while signals from said source are applied to said vertical deflection means and also while signals from said oscillator are applied to said vertical deflection means;

and means operated by said source-actuating means for operating said advancing means each time said source is operated and after signals resulting from such operation of said source and said timing lines have been photographed in said oscillograph to advance an unexposed part of said strip into said exposure zone and for holding said part of said strip stationary in said zone, while signals and timing lines resulting from the next operation of said source are being photographed in said oscillograph.

26. In combination:

an electronic device having an input and an output, said device including controllable means affecting the transmission of signals from said input to said output, said controllable means having a characteristic that varies with voltage applied thereto, said device also including means for applying to said input a signal representative of a characteristic of a formation adjacent said device;

a cable for supporting said device in a well opposite a formation, said cable comprising a pair of signal conductors, the output of said electronic device being connected to the lower ends of said pair of conductors;

an indicating device at the surface supplied with signals from said signal conductors;

a voltage source at the surface;

means bridging said signal conductors at the surface;

means bridging said signal conductors adjacent said electronic device;

means connected to said two bridging means to form a phantom connection between said voltage source and said controllable means;

and means for varying the voltage supplied from said source to said controllable means through said phantom connection.

27. In combination:

an electronic device having an input and an output, said device including controllable means affecting the transmission of signals from said input to said output, said controllable means having a characteristic that varies with voltage applied thereto, said device also including means for applying to said input a variable signal dependent upon a characteristic of a formation adjacent said device;

a cable for supporting said device in a well opposite a formation, said cable comprising a pair of signal conductors;

a transformer connecting the output of said electronic device to the lower ends of said pair of conductors;

an indicating device at the surface;

a transformer connecting the upper end of said conductors to said indicating device;

a voltage source at the surface;

a center-tapped resistance means bridging said signal conductors at the surface;

a center-tapped resistance means bridging said signal conductors adjacent said electrical device;

means connecting said voltage source and said controllable means to the center taps of both said resistance means for supplying a voltage from said source to said controllable means;

and means for varying the voltage supplied from said source to said controllable means.

28. In a system for logging wells, a seismic wave source and a pair of seismic wave receivers arranged at mutually spaced points in a well;

means for operating said source to cause a train of seismic waves to be emitted therefrom and into the neighboring formations, whereby the waves are detected successively at said receivers after transmission through formations into which the well extends;

transmission means including a pair of signal conductors for transmitting to the surface electrical waves corresponding to the seismic waves detected by said receivers;

a pair of amplifier channels having corresponding receivers connected in their inputs;

switching means for selectively connecting the output of one or the other of said amplifier channels to said pair of signal conductors;

means operated in synchronism with the passage of seismic waves past one of said receivers for operating said switching means to disconnect one amplifier channel from said pair of conductors and to connect the other amplifier channel thereto, whereby waves arriving successively at said receivers are separately transmitted over said pair of conductors to the surface;

each of said amplifier channels having a low-frequency cut-off above about 400 c.p.s., said transmission means having a low frequency cut-off below about 200 c.p.s.;

and means at the surface for displaying said electrical waves.

29. In a system for logging wells, a seismic wave source and a seismic wave receiver arranged in a well;
source-actuating means for operating said source to cause a train of seismic waves to be periodically emitted therefrom and into the neighboring formations, whereby the waves are detected at said receiver after transmission through formations into which the well extends;
means for generating a trigger pulse prior to the operation of said source;
means for transmitting to the surface said trigger pulse and also electrical waves generated by said receiver in response to seismic waves arriving thereat;
means at the surface controlled by said transmitted trigger pulse for generating a time break pulse simultaneously with the operation of said source;
and means at the surface for displaying said time break pulse and said electrical waves.

30. In a system for logging wells,
a seismic wave source and a seismic wave receiver arranged in a well;
source-actuating means for operating said source to cause a train of seismic waves to be periodically emitted therefrom and into the neighboring formations, whereby the waves are detected at said receiver after transmission through formations into which the well extends;
means for generating a trigger pulse prior to the operation of said source;
means for transmitting to the surface said trigger pulse and also electrical waves generated by said receiver in response to seismic waves arriving thereat;
means at the surface controlled by said transmitted trigger pulse for generating a time break pulse simultaneously with the operation of said source;
a cathode ray oscilloscope at the surface;
means controlled by said transmitted trigger pulse for initiating the sweep of a beam across the face of said oscilloscope;
and means for deflecting said beam to display said time break pulse and said transmitted electrical waves.

References Cited in the file of this patent
UNITED STATES PATENTS

| | | |
|---|---|---|
| 1,585,484 | Gasser | May 18, 1926 |
| 2,088,588 | Dudley | Aug. 3, 1937 |
| 2,200,476 | Mounce | May 14, 1940 |
| 2,238,991 | Cloud | Apr. 22, 1941 |
| 2,275,736 | Cloud | Mar. 10, 1942 |
| 2,413,063 | Miller | Dec. 24, 1946 |
| 2,436,563 | Frosch | Feb. 24, 1948 |
| 2,651,027 | Vogel | Sept. 1, 1953 |
| 2,704,364 | Summers | Mar. 15, 1955 |
| 2,705,319 | Dauber | Mar. 29, 1955 |
| 2,708,485 | Vogel | May 17, 1955 |
| 2,768,701 | Summers | Oct. 30, 1956 |
| 2,779,912 | Waters | Jan. 29, 1957 |